United States Patent [19]

Clancey

[11] Patent Number: 4,847,784

[45] Date of Patent: Jul. 11, 1989

[54] KNOWLEDGE BASED TUTOR

[75] Inventor: William J. Clancey, Portola Valley, Calif.

[73] Assignee: Teknowledge, Inc., Palo Alto, Calif.

[21] Appl. No.: 72,591

[22] Filed: Jul. 13, 1987

[51] Int. Cl.$^4$ .................. G06F 15/18; G06F 15/20
[52] U.S. Cl. ............................ 364/513; 364/300;
 364/900; 364/200; 364/274.5; 364/275.8
[58] Field of Search ............. 364/130, 148, 300, 513,
 364/200 MS File, 900 MS File, 419; 382/14,
 15; 434/118, 307, 308, 323

[56] References Cited

U.S. PATENT DOCUMENTS

| 4,360,345 | 11/1982 | Hon | 434/323 X |
| 4,490,810 | 12/1984 | Hon | 434/308 X |
| 4,586,905 | 5/1986 | Groff | 434/308 X |
| 4,648,044 | 3/1987 | Hardy et al. | 364/513 |
| 4,658,370 | 4/1987 | Erman et al. | 364/513 |

FOREIGN PATENT DOCUMENTS

WO86/00156  1/1986  PCT Int'l Appl. .................. 364/513

OTHER PUBLICATIONS

Van Melle et al., *The Emycin Manual*, Stanford University, Report No. STAN-CS-81-885, Stanford, CA 94305 (Oct. 1981).
Barr & Feigenbaum, *The Handbook of Artificial Intelligence*, vol. 2, Heuristech Press, Stanford, CA (1982), pp. 232–294.
Brown et al., "Pedogogical, Natural Language and Knowledge Engineering Techniques in Sophie I, II and III," Cognitive and Instructional Sciences, Xerox Palo Alto Research Center (1981).
William J. Clancey, "Tutoring Rules for Guiding a Case Method Dialog," *Intelligent Tutoring Systems*, Acadamic Press (1982), pp. 201–225.
William J. Clancey, "Methodology for Building an Intelligent Tutoring System," *Methods for and Tactics in Cognitive Science*, Laurence Erlbaum Assoc., Chapter 3, pp. 193–227, 1984.
Anderson et al., "The Geometry Tutor," Advanced Computer Tutoring Project, Carnegie-Mellon University; date unknown.

*Primary Examiner*—Joseph Ruggiero
*Attorney, Agent, or Firm*—Arnold, White & Durkee

[57] ABSTRACT

A knowledge system has a consultation system and also encodes domain-dependent tutoring knowledge as a set of conditions for interrupting the operation of the consultation system in order to evaluate a subject system. During the evaluation, the subject system is probed for its understanding of the status of the consultation system, and its understanding is compared to the actual status to obtain a measure of the subject system's knowledge and performance relative to that of the consultation system. The direction of the probing and the source of information for instruction or diagnosis is based upon the condition causing the interruption of the consultation system. Preferably an authoring system scans the domain-dependent knowledge base of the consultation system and determines a set of possible interrupt conditions. From this set a user exercises judgment in selecting a subset of conditions that are appropriate for the subject domain and the needs of the student. The selected conditions and a selected test case dialog are stored in a case file, and a number of different case files may be stored in a case library. The authoring system preferably creates a file or index of tutorial knowledge which correlates the relevant domain knowledge with the interrupt conditions. The tutorial knowledge includes, for example, expressions for causing interrupts after their values are found, rules concluding the expressions, the values concluded by the rules, and the factors in the rules.

45 Claims, 6 Drawing Sheets

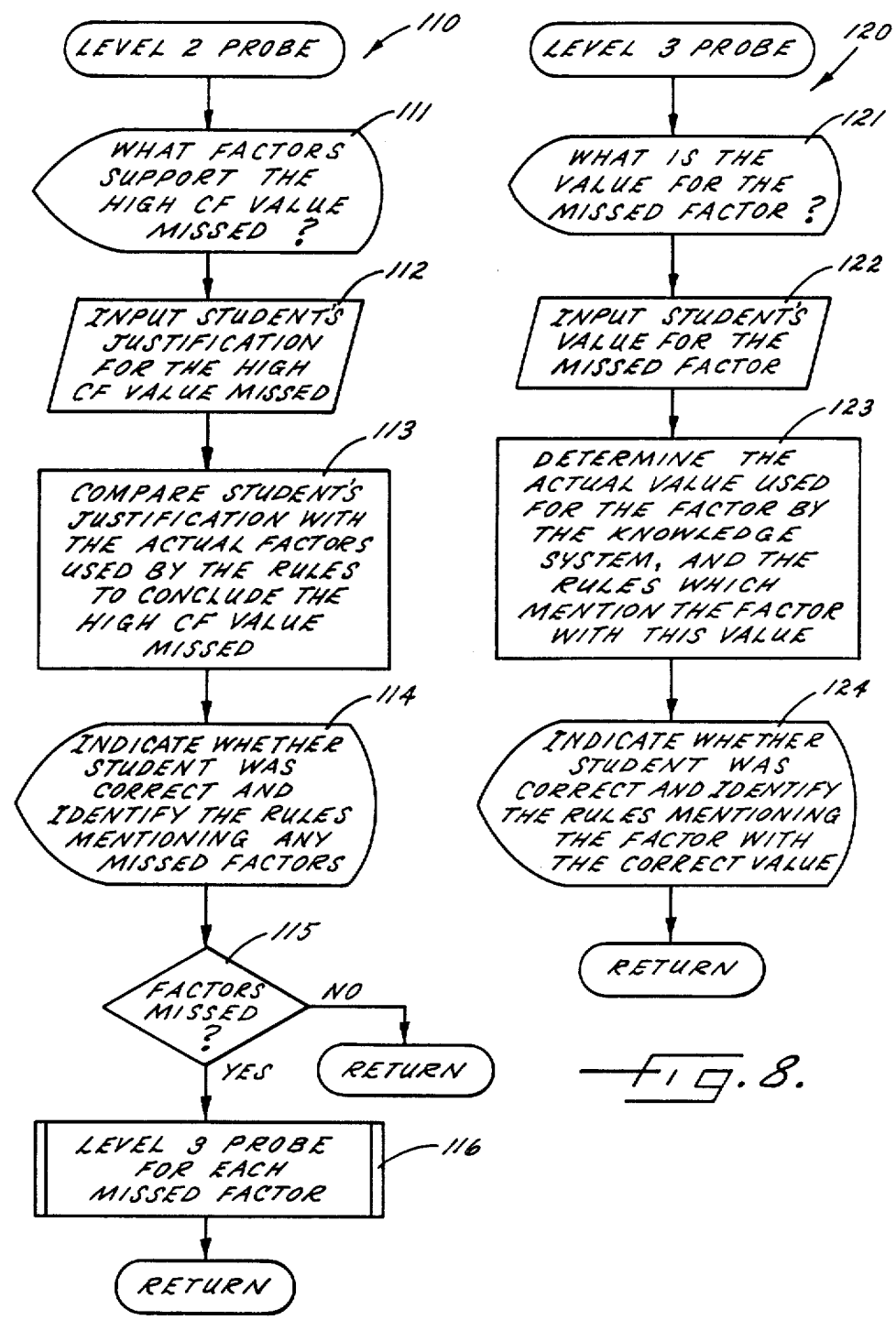

KNOWLEDGE BASED TUTOR

BACKGROUND OF THE INVENTION

1. Field of the Invention

The present invention relates generally to artificial intelligence and knowledge engineering, and more particularly to a digital computer for executing or interpreting a knowledge base to perform symbolic reasoning. The invention specifically relates to a knowledge system which enables its own knowledge and performance in problem solving to be compared to that of a student or expert for the purpose of providing instruction or evaluation.

2. Description of the Related Art

Knowledge systems are computer systems that emulate reasoning tasks by using an "inference engine" to interpret encoded knowledge of human experts stored in a "knowledge base". Knowledge systems are useful for problems that require diagnosis, recommendation, selection or classification. Such tasks in the past have been performed by human experts. If the domain of the knowledge base, or scope of the problem, is sufficiently narrow and a sufficiently large body of knowledge is properly encoded in the knowledge base, then the knowledge system can achieve performance matching or exceeding the ability of a human expert. In such a case the knowledge system becomes an "expert system".

The first step in building a knowledge system involves encoding unstructured and often unarticulated knowledge into machine readable form. For expert systems in a given application domain, several different kinds of knowledge are involved. The different kinds of knowledge include the vocabulary and structure of the domain, the judgmental knowledge of the domain, and the procedures or techniques by which the domain knowledge is applied to solve a specific problem. The vocabulary of the domain refers to the names of the individual objects and ideas that must be encoded in the knowledge base. The structure of the domain refers to relationships between the objects and the ideals in the domain. The judgmental knowledge of the domain refers to the rules of thumb or rules of inference which are used by human experts to solve a problem involving uncertain knowledge or to restrict the scope of relevant knowledge or to direct the search for solutions among various possibilities covered by the knowledge base. Therefore, to some extent the procedures or techniques by which the domain knowledge is applied are a part of the judgmental knowledge of the domain. The procedures or techniques, however, also include a good deal of knowledge that could be considered routine rather than judgmental, such as how to carry out a consultation with a user.

A user typically accesses knowledge in the knowledge system interactively during a consultation. It is important that the consultation occurs in a manner that assures the user that the knowledge in the knowledge base is being properly considered and applied. It is particularly important, for example, that the user is not asked for redundant information and is given specific reasons why the knowledge system arrives at particular conclusions.

Presently there are highly developed commercial tools which may be used by skilled knowledge engineers to build knowledge systems. The well-known commercial tools (such as KS300 manufactured by Teknowledge, Inc., 1850 Embarcadero Road, Palo Alto, California, 94303) are patterned after a tool called EMYCIN described in *The Emycin Manual* by Van Melle et al., Stanford University Report No. STAN-CS-81-885, Stanford, California, 94305 (October, 1981).

EMYCIN is specifically designed as a domain-independent system for constructing rule-based consultant expert system programs. Domain knowledge is represented in EMYCIN systems primarily as condition-action production rules which are applied according to a goal-directed backward chaining control procedure. Rules and consultation data are permitted to have associated measures of certainty, and incomplete data entry is allowed. The EMYCIN system includes an explanation facility that displays the line of reasoning followed by the consultation program, and answers questions from the user about the content of the knowledge base. When the user is asked for information, the user may respond by asking why information is being sought, and how information is known or will be found out.

EMYCIN also has special options called EXPLAIN, TEST and REVIEW for providing information at the end of the consultation about the values of selected groups of parameters. The parameters are selected by defining a variable named IMPORTANTPARMS. A condition may be specified that must be true in order for the option to have effect upon each group. The EXPLAIN option provides terse explanations about how the parameters' current values were concluded. With the TEST option specified, the system compares the current value of each parameter with a stored value for the case. REVIEW provides explanations, and if these are incorrect, helps the expert to locate the problems in the knowledge base.

A recognized shortcoming of the EMYCIN-based tools is that the high-level control knowledge about how to conduct a consultation is buried in the rules or is intermingled with definitions of objects and structures of the domain. As described in Erman et al., U.S. Pat. No. 4,658,370, this control knowledge should be made explicit by encoding it in an applicative an imperative procedural language defining control actions to be executed during interruption of a built-in control procedure at specified control steps. To provide transparent representation of control knowledge as well as factual knowledge, the knowledge base is preferably organized into distinct frames including the rules; control blocks separately encoding the control knowledge; and classes which become instantiated, attributes which take on values describing the class instances, class types, legal value hierarchies, and user defined functions, which all encode factual knowledge. The knowledge engineer may provide control blocks to be executed at the start of the consultation, after the instantiation of specified classes, when a value for a specified attribute is to be determined, after a specified attribute is determined, and upon explicit invocation by another control block.

The knowledge engineering tool described in Erman et al. U.S. Pat. No. 4,658,370 has been manufactured and sold by Teknowledge, Inc., 1850 Embarcadero Road, Palo Alto, Calif., 94303, under the trademakr "S.1". This knowledge engineering tool is intended for use by experienced knowledge engineers in building complex knowledge systems.

A knowledge engineering tool suitable for use by people with limited computer experience is described in Hardy et al. U.S. Pat. No. 4,648,044, herein incorporated by reference. Hardy discloses that because of the lack of knowledge engineering tools based on a transparent expert system language, a person needs a good deal of formal education in computer science as well as specialized training in knowledge engineering to become a skilled knowledge engineer. The term "expert system language" denotes the manner or way in which factual, judgmental and control knowledge is encoded in the knowledge base. Hardy et al. discloses a useful knowledge engineering tool for building an expert system and running a consultation on a personal-type microcomputer. The knowledge base language is easily understood because English-like language statements express facts, rules and meta-facts for specifying control knowledge, and control during a consultation is goal directed in depth-first fashion as specified by rule order. The tool includes interactive knowledge base debugging, question generation, legal response checking, explanation, and certainty factors. For the more experienced knowledge engineer, the tool permits the use of recursive rules and universally quantified variables.

The knowledge engineering tool described in Hardy et al. U.S. Pat. No. 4,648,044 has been manufactured and sold by Teknowledge, Inc., 1850 Embarcadero Road, Palo Alto, Calif., 94303, under the trademark "M.1". The current version of "M.1" provides a few additional features. The most significant of these includes a proposition called "do" for executing M.1 commands when applying a rule.

The above-mentioned knowledge system tools have been especially designed and widely used for constructing consultation systems which advise a user in a way which parallels the way that a human consultant advises a client. In this consultation mode, the system applies knowledge about how to solve a specified problem, and it also applies knowledge about how the consultation should be conducted with the user.

One field of application of knowledge systems is computer aided instruction, in which interactive computer programs are used for instigating and controlling learing. But a knowledge system that is an expert in a particular domain is not necessarily an expert teacher, since a good teacher must understand what the student is doing, not just what he is supposed do. A knowledge-based tutor should present a lesson optimized for each student, and should diagnose and correct a student's misunderstandings.

As described in A. Barr & E. Feigenbaum, *The Handbook of Artificial Intelligence*, Vol. 2, HeurisTech Press, Stanford, Calif. (1982) pp. 223-294, the main components of an intelligent computer-aided instruction (ICAI) system are problem solving expertise, a student model, and tutoring strategies. The problem solving expertise is the knowledge that the system tries to impart to the student. The student model is used to indicate what the student does and does not know. The tutoring strategies specify how the system presents material to the student.

On page 233 of *Barr and Feigenbaum, supra*, it is said that the tutoring module of ICAI systems must integrate knowledge about natural language dialogs, teaching methods, and the subject area. This is the module that communicates with the student, selecting problems for him to solve, monitoring and criticizing his performance, providing assistance upon request, and selecting remedial material. The design of this module involves issues such as when it is appropriate to offer a hint or how far the student should be allowed to go down the wrong track. This additional knowledge, beyond the representation for the subject domain and of the student's state of understanding, is knowledge of how to teach.

As described in *Barr and Feigenbaum, supra*, ICAI systems have been built which more or less demonstrate various parts of what would constitute a fully useable system.

A system called SCHOLAR by Jaime Carbonell concentrated on handling unanticipated student questions and generating instructional materials in varying levels of detail, according to the context of the dialog. The domain knowledge was represented in a semantic net separate from the tutor. A goal was to make the tutorial reasoning strategies independent of the domain being discussed.

A system called WHY by Alan Collins and Albert Stevens focussed on Socratic-style probing of causal relations, and attempted to reveal inadequacies in a student's general model of causal relations by selecting examples which violate rules the student has articulated.

SOPHIE (I, II and III) by John Seely Brown and Richard Burton permitted broad student initiative during tutorial interaction, and used numerous heuristic strategies for answering the student's questions, criticizing his hypotheses, and suggesting alternative theories for his current hypotheses. The original Sophie was extended by providing an articulate expert debugger or explainer having the capability to solve the problem as presented to the student and to explain reasoning or interpretation as data pertaining to the problem was given to the student. SOPHIE I, II and III are also described in Brown et al., "Pedagogical, Natural Language and Knowledge Engineering Techniques in SOPHIE I, II and III," Cognitive and Instructional Sciences, Xerox Palo Alto Research Center, REPRINTED IN Sleeman et al., eds., *Intelligent Tutoring Systems*, Academic Press (1981).

A system called the WUSOR/WUMPUS Tutor by Ira Goldstein described student knowledge in terms of expert rules by a use/appropriate ratio, and explained the reasoning of an expert when a student behaved differently. The system included four modules: the Expert, the Psychologist, the Student Model, and the Tutor. The Expert told the Psychologist if a player's move was nonoptimal and which skills were needed for the player to discover better alternatives. The Psychologist employed this comparison to formulate hypotheses concerning wich domain specific skills are known to the student. These hypotheses are recorded in the Student Model, which represents the student's knowledge as a subset of the Expert's skills. The Tutor uses the Student Model to guide its interactions with the player. Basically, it chooses to discuss skills not yet exhibited by the player in situations where their use would result in better moves.

A system called GUIDON by William J. Clancey demonstrated that teaching knowledge could be treated analogously to the domain expertise of consultation systems. The teaching knowledge was codified in rules and built incrementally by testing it on different cases. For encoding knowledge of the problem domain, GUIDON used the EMYCIN-type production rules of a consultation expert system called MYCIN designed for diagnosing infectious diseases. The MYCIN rules were separate from the teaching rules and they were not modified for the tutoring application but they were used in new ways, for example, for forming quizzes, guiding the dialog, summarizing the evidence, and modeling the student's understanding.

Sample interactions with GUIDON are shown on pages 268-270 and 273-274 of *Barr and Feigenbaum, supra.* The student asks for the data and subgoals relevant to the topic being discussed. These are extracted from MYCIN's rules. The student asks how a particular datum is useful. He is given the case specific information, and then a summary of its use in the rule or rules that apply in this case. The student indicates that he has determined a particular subgoal. If the student's response were not consistent with his claim, he would be asked to state his conclusion and then possibly support it. When the topic of discussion is completed, the student is given a summary of the relevant conclusions. "Key factors" from each rule are automatically extracted and only the "interesting" (useful) conclusions are displayed. GUIDON also probes the student to determine whether the student knows why an alternative hypothesis is discredited. GUIDON asks the student to state a hypothesis for a subgoal. The program asks the student to support his hypothesis. Factors received from the student are related to the MYCIN rules, and the student is told whether the factors are correct and is told about factors missed. Other hypotheses are then discussed.

Before a session with a student begins, a case to be presented to the student is selected from a case library, and GUIDON uses MYCIN to "solve" the case. The results of this background consultation are reconfigured so that the rules are indexed both by the goals that they conclude about and the subgoals or data needed to apply them. During the tutorial session, the student inquires and receives more case data, and the same information is used to drive the MYCIN rules in a forward direction. The record of what the expert (i.e., MYCIN) "knows" at any given time during the student-run consultation forms the basis for evaluating the student's partial solutions and providing assistance.

The operation of GUIDON is further described in William J. Clancey, "Tutoring Rules for Guiding a Case Method Dialog," appearing in Sleeman & Brown, eds., *Intelligent Tutoring Systems,* Academic Press, Inc. (1982) pp. 201-225, and William J. Clancey, "Methodology for Building an Intelligent Tutoring System," appearing in Kintsch et al., eds., *Methods and Tactics in Cognitive Science,* Lawrence Erlbaum Assoc., Chapter 3 (1984).

A LISP/GEOMETRY Tutor by John Anderson is described in Anderson et al., "The Geometry Tutor," Advanced Computer Tutoring Project, Carnegie-Mellon University. The program asks a student to solve a problem, and the program matches each student input against rules for ideal and inferior student behavior. The program corrects the student when the student's behavior deviates below a minimum threshold.

SUMMARY OF THE INVENTION

The inventor has discovered that intelligent computer aided instruction systems have not been applied to a wide range of subject domains due to the relative difficulty of properly tailoring the instruction to the subject domain and the needs of the student. This has required domain-dependent tutoring knowledge that is relatively difficult to encode. Moreover, considerable dialog with the student and computer execution time and programming have been required to determine the student's needs and to provide for a variety of levels of instruction responsive to those needs.

Accordingly, the primary object of the present invention is to provide a practical domain-independent tutor shell accepting the knowledge base of a consultation system and providing instruction tailored to the subject domain and the needs of the student.

Another object of the invention is to provide a knowledge based tutor which easily accepts domain-dependent tutoring knowledge from a user.

Still another object of the invention is to provide a knowledge based tutor which transparently encodes domain-dependent tutoring knowledge without the use of rules.

Yet another object of the invention is to provide a knowledge based tutor which tailors instruction to the subject domain and the needs of the student by using a minimum of computer execution time and programming.

And still another object of the invention is to provide a knowledge based tutor that is efficient for use by an expert to evaluate the content and capabilities of a domain knowledge base.

Moreover, another object of the invention is to provide a knowledge based tutor capable of extending its own knowledge base.

Briefly, in accordance with the invention, a knowledge based tutor includes a consultation system and encodes domain-dependent tutoring knowledge as a set of conditions for interrupting the operation of the consultation system in order to evaluate a subject system. During the evaluation, the subject system is probed for its understanding of the status of the consultation system, and its understanding is compared to the actual status to obtain a measure of the subject system's knowledge and performance relative to that of the consultation system.

The subject system can be a student, in which case deficiencies in the student's knowledge and performance are corrected by providing relevant instruction guided by further probing. Alternatively, the subject system can be an expert, in which case deficiencies in the knowledge and performance of the consultation system are revealed by providing relevant information to the expert, and the deficiencies are diagnosed by further probing of the expert. In either case, the direction for the initial probing and the source of the instruction or information provided to the subject system are easily determined from the condition causing the interruption of the consultation system. Depending upon the condition, relevant domain knowledge from the consultation system is selected for probing, instruction, or diagnosis.

In order to easily accept domain-dependent tutoring knowledge from a user, there is provided an authoring system which scans and analyzes the knowledge base of the consultation system to determine a set of possible interrupt conditions. These interrupt conditions are presented to a user, such as a teacher. The user can then exercise judgment in selecting the interrupt conditions that are appropriate for the subject domain and a group of students. Further, the teacher can also run a test consultation to provide a test case suitable for the group of students, and the interrupt conditions and the test consultation can be selected so as to be most compatible. To suit the needs of a variety of students, user dialog input and interrupt conditions can be stored in a case file, and case files for a variety of groups of students or for a number of subject domains can be stored in a case library. The student then selects or is assigned an appropriate one of the cases for use as input to the knowledge based tutor.

In order to reduce the computer processing time when a test case is run, the authoring system preferably creates a file or index of tutorial knowledge which correlates the relevant domain knowledge with the interrupt conditions. Therefore, when the consultation is interrupted, the relevant domain knowledge is immediately available for probing, instruction or diagnosis. To create the file or index of tutorial knowledge, the authoring system preferably includes an analysis system that analyzes the domain knowledge base of the consultation system to determine lists of pointers pointing to relevant expressions concluded by rules, the rules concluding those expressions, the values concluded for those rules for the relevant expressions, and the factors of those rules. In this case the relevant expressions are used to indicate interrupt conditions occurring when the values of the expressions are found during the consultation, and the indexed values, rules and factors are used for probing the subject system to a depth of three levels for information pertaining to the expression causing the interrupt.

In order to reduce the amount of programming required for the knowledge based tutor, the consultation system is preferably implemented using a knowledge system shell having an extensible knowledge base language, and the tutor system is programmed as a knowledge base appended to the domain knowledge base of the consultation system. The preferred knowledge system shell is described in Hardy et al. U.S. Pat. No. 4,648,044, herein incorporated by reference.

BRIEF DESCRIPTION OF THE DRAWINGS

Other objects and advantages of the invention will become apparent upon reading the following detailed description and upon reading the following detailed description and upon reference to the drawings in which:

FIG. 7 is a flowchart of a procedure for performing a level 2 probe concerning important values missed by a student; and FIG. 8 is a flowchart of a procedure for a level 3 probe concerning factors missed by the student.

Figure 1:
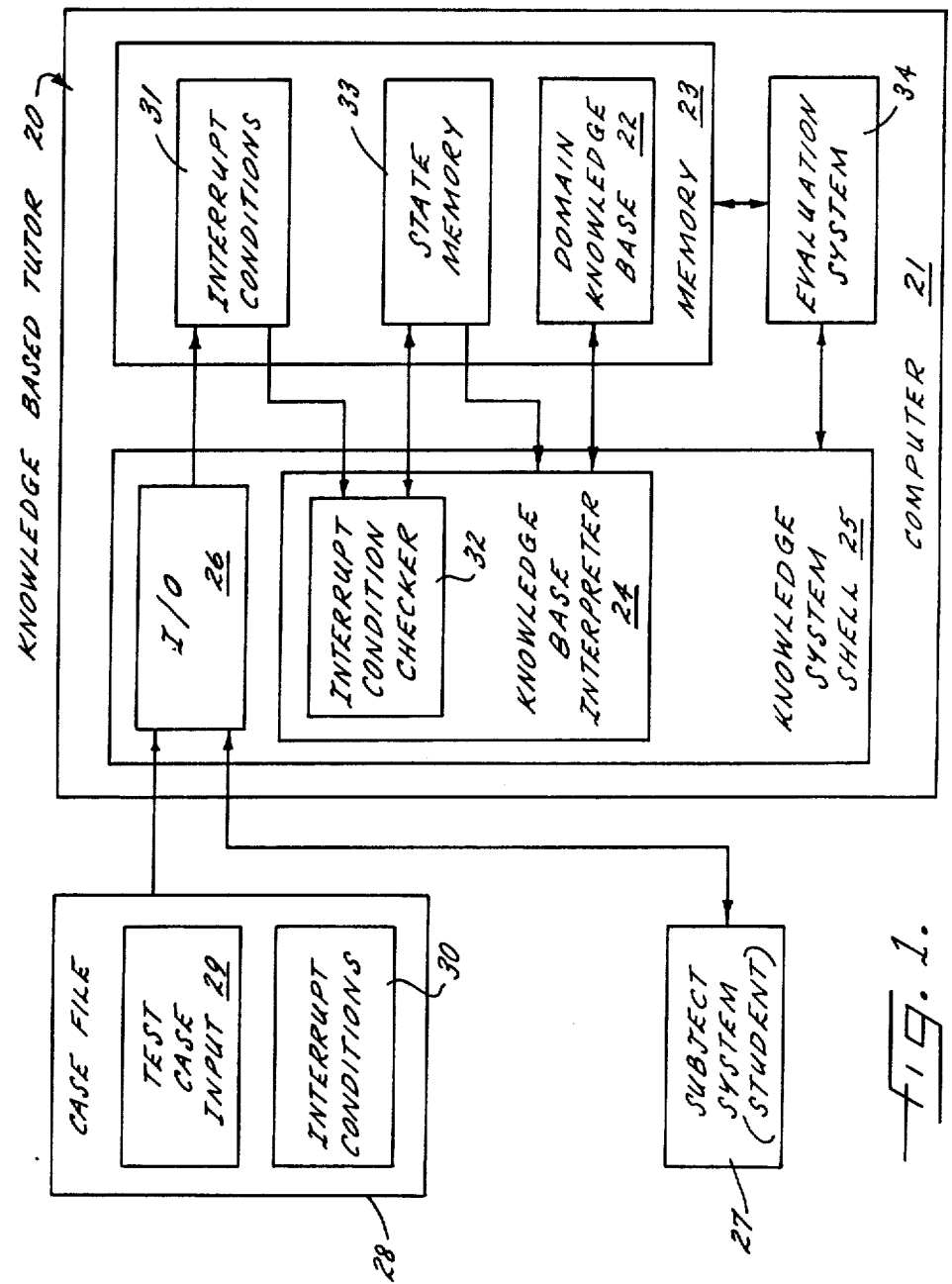
FIG. 1 is a block diagram of the knowledge based tutor (KBT) according to the invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to the drawings, there is shown in FIG. 1 a functional block diagram of the preferred embodiment of a knowledge based tutor (KBT) generally designated 20. The KBT 20 includes a number of software modules residing in a computer 21. As will be further described below, the software modules are relatively compact so that the computer 21 can be any one of a number of small personal-type microcomputers.

In order to provide the KBT with domain knowledge, the KBT 20 includes a domain knowledge base 22 residing in the memory 23 of the computer 21. In order to reason over the domain knowledge base, the computer 21 includes a knowledge base interpreter 24. Therefore, the knowledge based turor 20 is a knowledge system capable of symbolic reasoning. The knowledge base interpreter 24 is preferably part of a knowledge system shell which has an input and output unit 26 for communicating with a subject system 27 and for reading and writing files, such as a case file 28. A preferred knowledge system shell is described in Hardy et al. U.S. Pat. No. 4,648,044, incorporated herein by reference. Such a system shell is commercially available from Teknowledge Inc., 1850 Embarcadero Road, P.O. Box 10119, Palo Alto, Calif., 94303, and is sold under the trademark "M.1".

The knowledge based tutor 20 employs a case study method of instructing the student 27 while indicating the methods of the solution to specific problems. The case study method is particularly attractive since the knowledge system shell 25 typically includes all of the required facilities for creating and maintaining a domain knowledge base 22 for providing a consultation system. An example domain knowledge base 22 is provided by the "Wine Advisor" shown in Appendix VII of Hardy et al. U.S. Pat. No. 4,648,044. For practicing the case study method, the case file 28 includes test case input 29 which, for example; is substituted for the input of the consultation user or client. The knowledge system 25 reproduces the method of solution for the test case and indicates the method of solution to the student 27. So that the student 27 does not become passive during the solution of the test case, the test consultation could alternatively be run by presenting the test case input to the student as a set of facts, and requiring the student to correctly enter the relevant facts as the facts are called for during the test consultation.

In accordance with an important aspect of the present invention, the knowledge based tutor 20 provides additional instruction to the student 27 by interrupting the test consultation when specified conditions occur. These conditions are specified in a record 30 of the case file 28.

So that the interpretation of the domain knowledge base 22 by the knowledge base interpreter 24 is interrupted whenever any one of the interrupt conditions 30 occur, the input and output unit 26 transfers the interrupt conditions 30 from the casefile 28 to cache memory 31 which is addressable by the knowledge system 25. The knowledge system 25 further includes an interrupt condition checker 32 which determines whether the interrupt conditions occur by periodically checking a state memory 33. The state memory includes a record of the status of the consultation, including, for example, indications of whether expressions have had their values determined, and the values of determined expressions.

In accordance with an important aspect of the present invention, a consultation is interrupted upon the occurence of any one of the specified conditions so that an evaluation system probes the subject system 27 about the condition having caused the interruption. Specifically, the evaluation system 34 probes the subject system 27 to obtain a response about the status of the solution of the problem by the knowledge base interpreter 24, and compares the response to the actual status of the solution of the problem. As will be further described below, relevant information about the status of the solution of the problem is obtained by accessing the state memory 33 and interpreting the domain knowledge base 22 in accordance with the condition having caused the interrupt.

Figure 2:
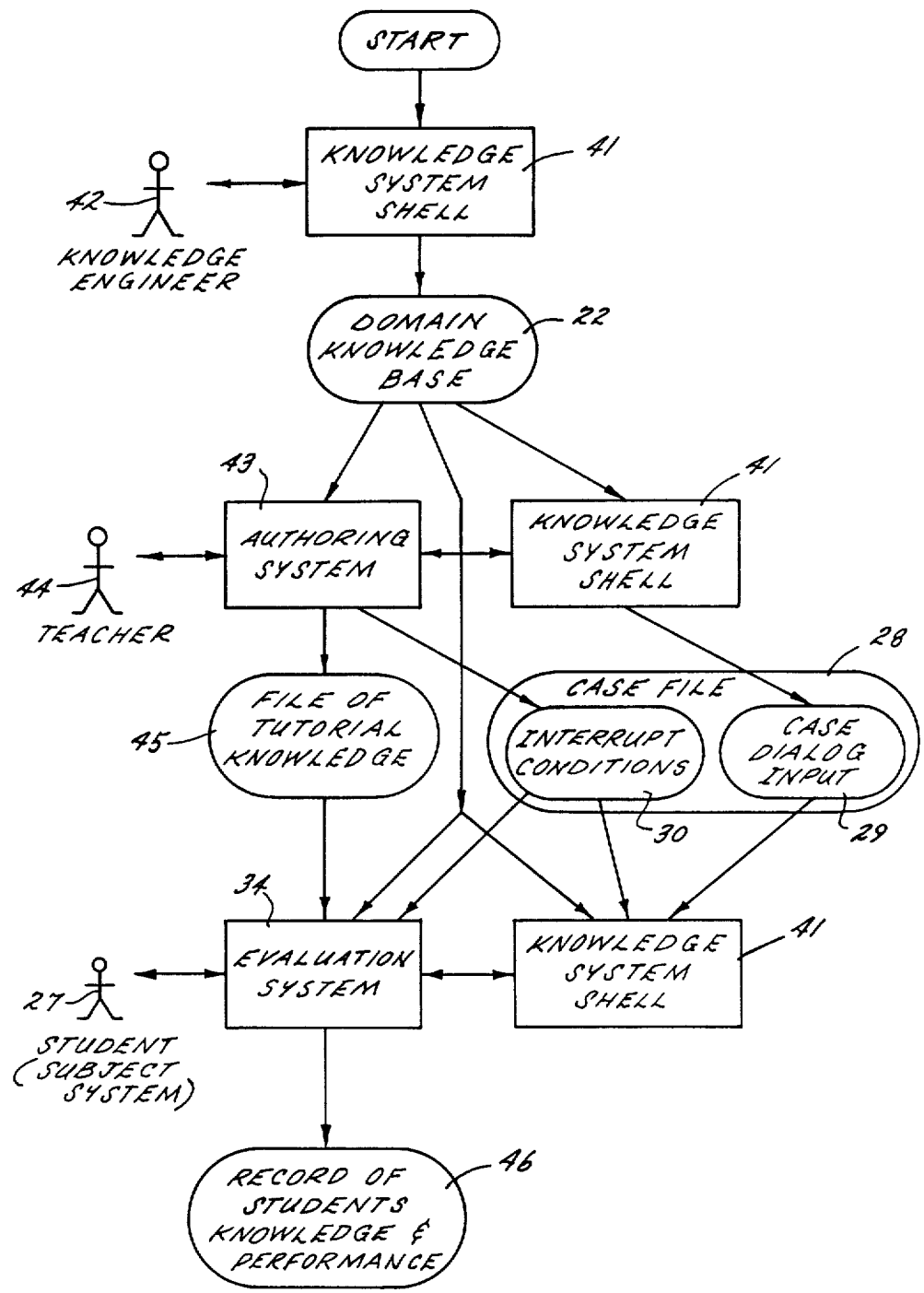
FIG. 2 is a flow diagram showing how various kinds of knowledge are used by the KBT.

Turning now to FIG. 2, there is shown a flow diagram illustrating how the knowledge based tutor 20 of FIG. 1 is supplied with domain knowledge and tutoring knowledge. A knowledge engineer 42 creates the domain knowledge base 22 by using the knowledge system shell 41. This process is known as "knowledge acquisition" and involves the extraction and formulation of knowledge derived from current sources such as experts. The knowledge engineer encodes this knowledge into a machine readable form by defining expressions which represent objects or ideas in the subject domain, and by writing rules which specify relations between these objects and ideas.

In accordance with an important aspect of the present invention, the tutorial knowledge for the knowledge based tutor is generated by an authoring system which analyzes the content of the domain knowledge base 22 to determine conditions of interest during a test consultation. As shown in FIG. 2, the teacher 44 uses the authoring system 43 in conjunction with the knowledge system shell 41 in order to create the test case input 29 by supplying case dialog input, and by selecting interrupt conditions 30. As will be further described below, the authoring system 43 scans the domain knowledge base 22 and determines a set of conditions suitable for interrupting the test consultation. These conditions of interest are shown to the teacher 44, and the teacher 44 selects a subset of these conditions by exercising his or her judgment in consideration of the test case and the needs of the student.

In accordance with another important aspect of the present invention, the authoring system 43 also analyzes the domain knowledge base 22 to create a file of tutorial knowledge. Preferably the file of tutorial knowledge 45 is organized as an index of the information in the knowledge base pertaining to each of the interrupt conditions. The file of tutorial knowledge is therefore quickly accessed to supply information pertaining to the respective condition causing the interrupt, in order to provide information about the status of the solution of the specified problem.

Now that the file of tutorial knowledge 45 in the case file 28 has been created, the student 27 may use the knowledge system shell 41 for viewing the test case. Alternatively, the student may make up his own test cases by supplying dialog input to the knowledge system shell, and this can be done interactively in the usual fashion for a consultation system. When any of the interrupt conditions 30 occur during the test consultation, the test consultation is interrupted and the evaluation system 34 is operated to prompt the student 27 for information pertaining to the condition having caused the interrupt. The relevant information is obtained by reading the file of tutorial knowledge 45 for the condition having caused the interrupt, and by reading the domain knowledge base 22 in accordance with information read from the file of tutorial knowledge. After probing the student 27 for a response, the response is compared to the knowledge in the knowledge base 22 pertaining to the interrupt condition in order to evaluate the student's knowledge and performance. As shown in FIG. 2, the result of the comparison is recorded as a record 46 of the student's knowledge and performance.

Figure 3:
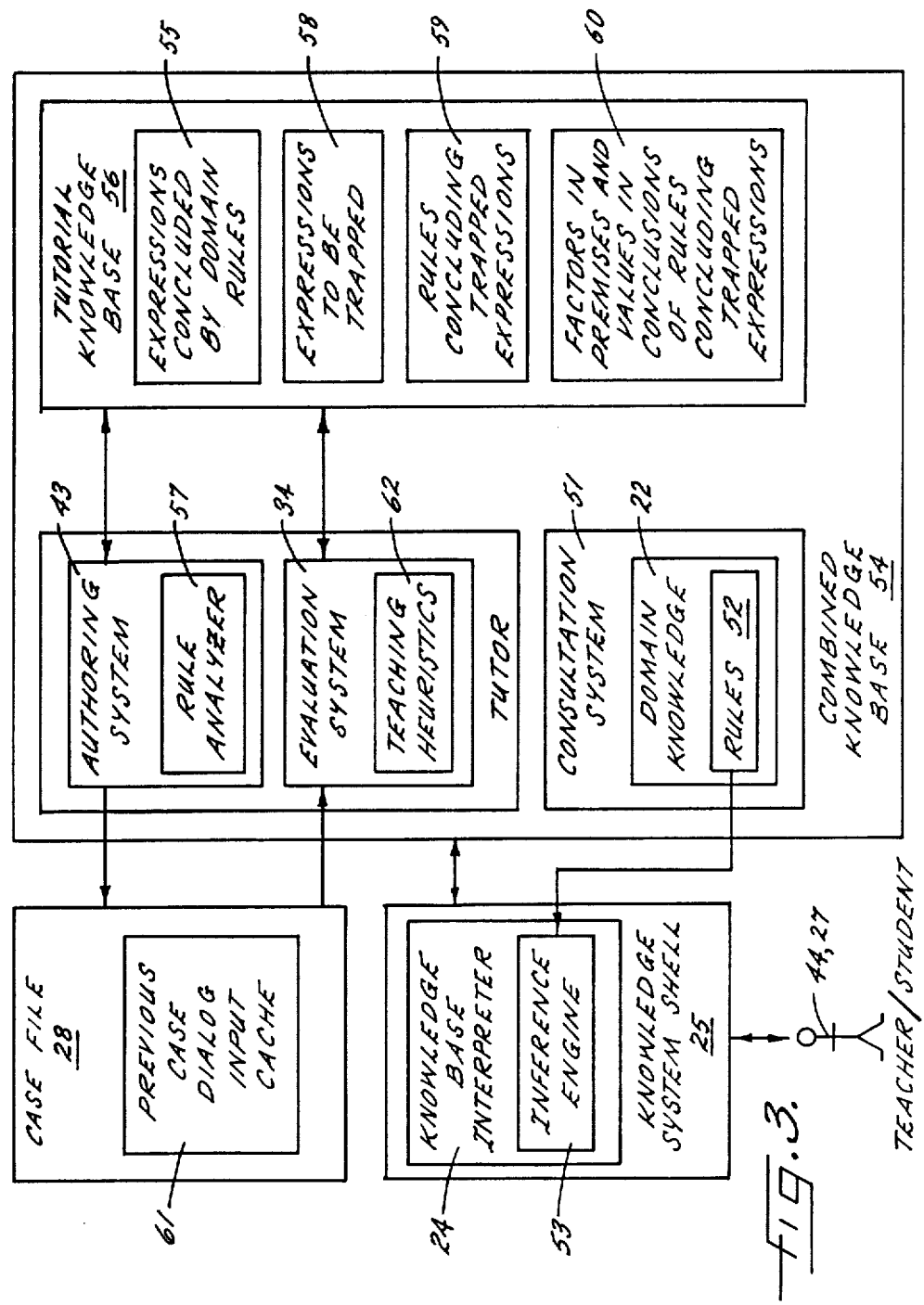
FIG. 3 is a detailed block diagram of the preferred organization of the KBT.

Turning now to FIG. 3, there is shown a block diagram of the preferred implementation of the various software modules in the knowledge based tutor. The knowledge system shell 25 is preferably the "M.1" (Trademark) shell sold by Teknowledge, Inc., 1850 Embarcardero Road, P.O. Box 10119, Palo Alto, Calif., 94303. To run a test consultation, the knowledge base interpreter 24 of the knowledge system shell 25 interprets a consultation system knowledge base 51 which encodes the domain knowledge 22. The domain knowledge 22 includes rules 52 which are applied by an inference engine 53 in the knowledge base interpreter 24.

In accordance with an important aspect of the present invention, the authoring system 43 and the evaluation system 34 are implemented as procedures loaded into a "combined" knowledge base 54 which is interpreted by the knowledge base interpreter 24. Therefore the authoring system 43 and the evaluation system 34 are written in the same language as the domain knowledge base 22. This has the advantage of considerably reducing the amount of programming for the authoring system 43 and the evaluation system 34. A listing of the preferred authoring system 43 is included in Appendix II, and a listing of the preferred evaluation system is included in Appendix III. These listings are written in the knowledge base language of "M.1" (Trademark), which incorporates the knowledge base language described in Hardy et al. U.S. Pat. No. 4,648,044.

The "M.1" (Trademark) language has a proposition which enables the inference engine 53 to be interrupted upon the occurrence of a specified condition. The specified condition is tested whenever the values for any expression have been sought. The interrupt condition and the procedure to be implemented upon interrupt is specified by writing a "whenfound" proposition in the knowledge base 54. "Whenfound" statement is defined at columns 53 and 54 of Hardy et al. U.S. Pat. No. 4,648,044 as follows:

whenfound
(EXPRESSION=VALUE)=PROPOSITION

Whenever the inference engine 53 has finished seeking and has found all values for any expression, the knowledge base interpreter 24 searches the knowledge base for a "whenfound" proposition defined for the expression which was sought. If such a statement is found in the knowledge base 54, then the knowledge base interpreter 24 checks whether the expression has the value specified in the "whenfound" statement. If this is true, then the proposition specified in the "whenfound" statement is tested. Therefore, in order to interrupt the consultation system 51 to operate the evaluation system 34, a "whenfound" statement is written which specifies the interrupt condition as EXPRESSION=VALUE and which includes a PROPOSITION which when tested causes invocation of the evaluation system 34 for probing of the subject system.

The authoring system 43 as shown in Appendix II scans the knowledge base and determines which expressions are concluded by the domain rules 52. These expressions are stored as entries 55 in a tutorial knowledge base which is part of the combined knowledge base 54.

For scanning and parsing the rules, the authoring system uses the matching capabilities of "M.1" (Trademark), and specifically invokes the "KBENTRY" function which operates substantially as shown in Hardy et al. U.S. Pat. No. 4,648,044. Since the authoring system 43 and the evaluation system 34 are also located in the knowledge base 54 and may employ rules, a user-defined proposition in the form of "hide(EXPR)." is written for each of the expressions EXPR which are defined by the authoring system and the evaluation system and which are to be hidden from the scanning and parsing process. This scanning and parsing process is performed by a rule analyzer 57 which ignores expressions that have been defined in a "hide(EXPR)." statement.

In order to specify interrupt conditions, the user such as the teacher 44 is shown a list of the expressions 55 concluded by the domain rules 52. The teacher 44 selects a subset of these expressions to be "trapped" when the student 27 views a test consultation. These expressions to be trapped are stored as a list 58 in the tutorial knowledge base 56. Then the rule analyzer 57 scans the domain rules 52 to determine the rules concluding the trapped expressions. These rules are also stored in a list 59 in the tutorial knowledge base 56. Moreover, the rule analyzer analyzes these rules to determine factors in the premises and the values in the conclusions of the rules, and the factors and values are stored in the tutorial knowledge base 56. Therefore, the authoring system interacts with a human user such as the teacher 44 to define an evaluation policy which is encoded in the tutorial knowledge base 56.

The tutorial knowledge base is a kind of secondary knowledge base which becomes stored in the case file 28 as part of the previous case dialog input cache 61. To make up the case file 28, the teacher 44 uses the knowledge system shell 25 to interpret the consultation system 51 to run to test case. The user input during this test case is also stored in the previous case dialog input cache 61.

When the student 27 uses the knowledge system shell 25, the evaluation system 34 is first invoked. This evaluation system reads the previous case dialog input cache 61 from the case file and loads it into the pointer cache 56 in the knowledge base 54. Also, traps are set by writing into the knowledge base entries of the form:

whenfound(EXPR=ANY)=whenfoundtutor-(EXPR).

The evaluation system 34 then invokes the consultation subsystem 51 so that a test consultation is run for the student 27 using previous case dialog input from the case file 28. This test consultation continues until any one of the expressions to be trapped becomes sought and values for the trapped expression are found. When this occurs, the "whenfound" statement for the trapped expression causes the evaluation system to apply teaching heuristics 62 for probing the student 27 regarding information related to the trapped expression. Specifically, the evaluation system uses the teaching heuristics 62 to generate multiple-choice questions, to supply correct answers, to probe for the connection between a correct answer and the original probe, and to probe for important factors or conclusions.

It should be noted that the authoring system and the evaluation system 34 have the ability to invoke top-level commands of the knowledge base interpreter 24. This is done, for example, to add and delete entries from the knowledge base 54, to transfer data between the case file 28 and the pointer cache 56, and to cause execution to be passed to the consultation system 51.

In order to permit the authoring system 43 and the evaluation system 34 to execute top-level commands of the knowledge base interpreter 24, there is provided a proposition in the form of "do(LIST)". When this proposition is encountered in the premise of a rule and is tested, any commands in LIST are executed by the knowledge base interpreter 24.

The authoring system 43 and the evaluation system 34 invoke a number of other "M.1" (Trademark) propositions which simplify their programming. These propositions include a "nocheck(EXPR)" metafact which inhibits checking of the specified expression at run-time to see if it contains variables. This allows the seeking and caching of expressions with variables.

The proposition "nocache(EXPR)" prevents values of a specified expression from being stored permanently in the cache. When the specified expression is evaluated, the results are temporarily cached and the proposition that depends on the result is tested. Then, before proceeding, the entry for the expression is removed from the cache. If the value of a "no cache" expression is needed later in a consultation, the inference engine again seeks its values.

A proposition in the form of "noautomaticquestion-(EXPR)" prevents an automatic question from being generated for the expression even if there are no other knowledge base entries for the expression. If the expression EXPR is a variable, then it turns off the automatic question facility for all expressions.

The proposition "X==Y" tests for a strict equality without evaluating X, as it is true when X matches Y. This proposition is true when X and Y are the same atom, the same number, or the same term. X and Y may contain variables which will be bound by the match.

The proposition "stringjoin(STRINGS)=STRING" joins the strings together into one string. The proposition "termof(STRING)=TERM" converts the characters of "STRING" into a term, just as if the characters were read from the keyboard. In the process quotes are removed from the string and the syntax of the characters between the quotes is checked.

A metaproposition in the form of "member(LIST)=V" test for membership in a list and can be used to back-track or "cycle" through all the members of a list. If V is a variable, then V is bound to each of the members of LIST in turn.

A proposition in the form of "display(FILE, ITEM)" causes the named ASCII file to be opened, apends the items to the end of the file, and closes the file.

A meta-fact in the form of "command(NAME[(ARGUMENT)]) =LIST" is used to define a new command. Whenever the user types in the command name (with or without an argument), the command is executed by evaluating the propositions in the specified list.

The "kbentry" proposition can used in the form of "kbentry(LABEL: ENTRY and KEY)" in order to reason about entries in the knowledge base. The LABEL and KEY are optional. KEY is the expression under which the knowledge based entry in index.

A top-level command named "savechanges" saves all adds and edits to the knowledge base since the start of a consultation session. These changes are written in a text file which is loadable. The "savechanges" command is used, for example, to create a text file for storing the tutorial knowledge base in the case file.

The use of the above propositions and commands is further described by comments included in the program listings of the authoring system 43 in APPENDIX II and the evaluation system 34 in APPENDIX III.

Figures 4, 5:
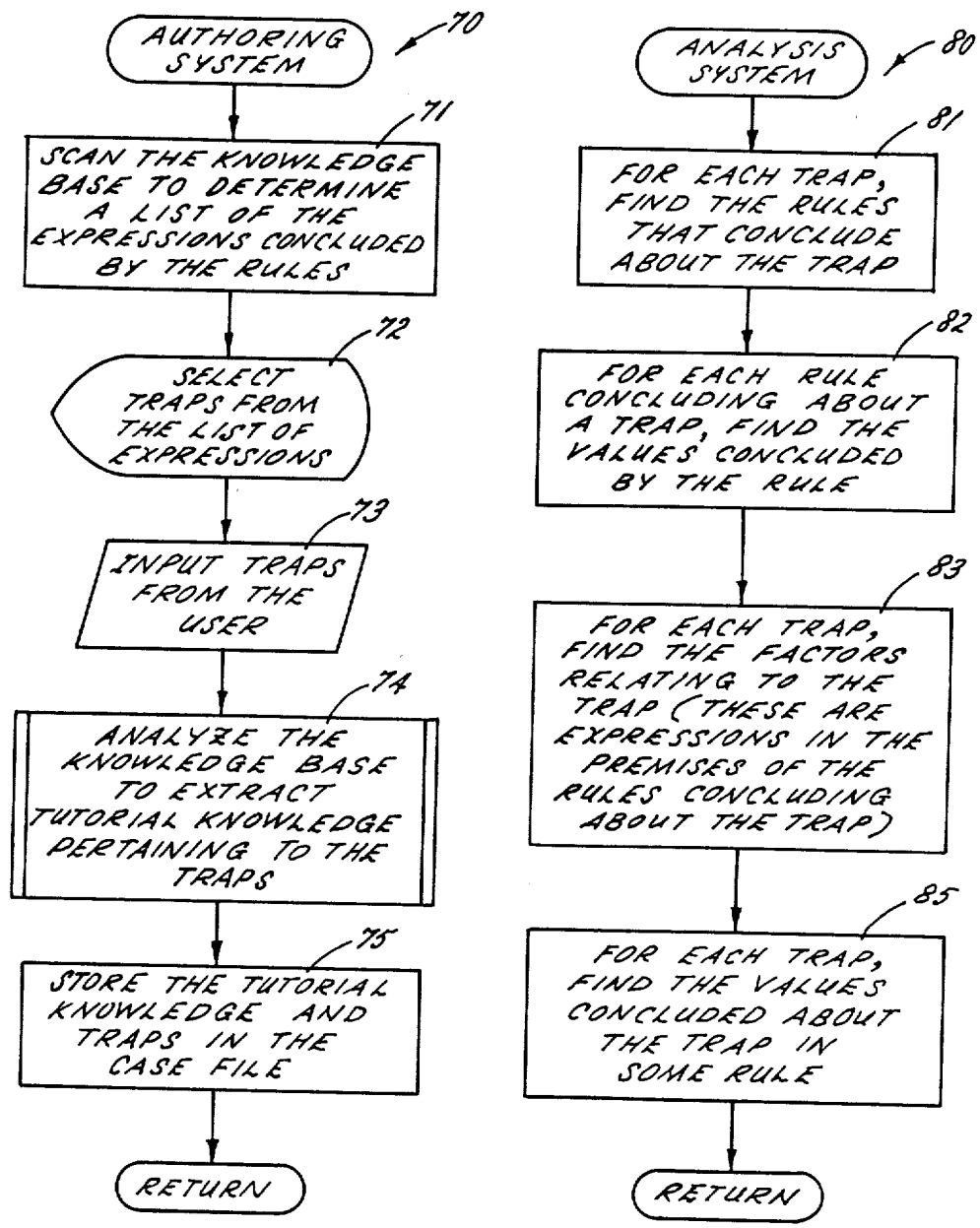
FIG. 4 is a flowchart of an authoring system used by the KBT to generate an evaluation procedure.
FIG. 5 is a flowchart of an analysis system used by the authoring system of FIG. 4 for indexing components of the knowledge base which relate to interrupt conditions or traps.

Turning now now to FIG. 4 there shown a flowchart generally designated 70 for the authoring system. This flowchart will be explained in connection with the input/output listing of APPENDIX IV. As shown in the input/output listing, the authoring system is loaded into the knowledge base of the "M.1" (Trademark) knowledge system shell by typing the command "load tshell.kb". Then interpretation of the authoring system is started by typing the command "author wine" so that the authoring system generates an evaluation procedure for teaching about the knowledge base "wine".

In the first step 71 of the authoring system, the knowledge base is scanned to determine a list of expression concluded by the rules. Then, in step 72, the user is told to select traps from the list of expressions. Specifically for the "wine" knowledge base, the user is given the option of selecting one or more of eight different expressions. In step 73 the selected traps are received from the user. Next, in step 74, the knowledge base is analyzed to extract tutorial knowledge pertaining to the traps. Finally, in step 75 the tutorial knowledge and the traps are stored in the case file.

Turning now to FIG. 5, there is shown a flowchart generally designated 80 of an analysis system used by the authoring system in step 74 for extracting the tutorial knowledge pertaining to the trap expressions. In the program listing for the authoring system in APPENDIX II, this analysis system is implemented as a rule concluding the expression "initialized (X)".

In the first step 81 of the flowchart 80, for each trap, the rules in the knowledge base are found that conclude about the trap. These rules are stored in a list named "rulesfor(EXPR)". Next, in step 82, for each rule concluding about a trap, the values are found that are concluded by the rule. These values are represented by the expression "conclvals(RULE)". Next, in step 83, for each trap, the factors relating to the trap are found. The factors are the expressions in the premises of the rules concluding about the trap. Moreover, the analysis system temporarily instantiates variables in the premises of rules concluding about a trap, in order to find the factors which the variables may represent. Once the factors are found, they are represented as the values of an expression named "factorsfor(EXP)". Finally, in step 84, for each trap, the values are found that the rules conclude about the trap.

Figure 6:
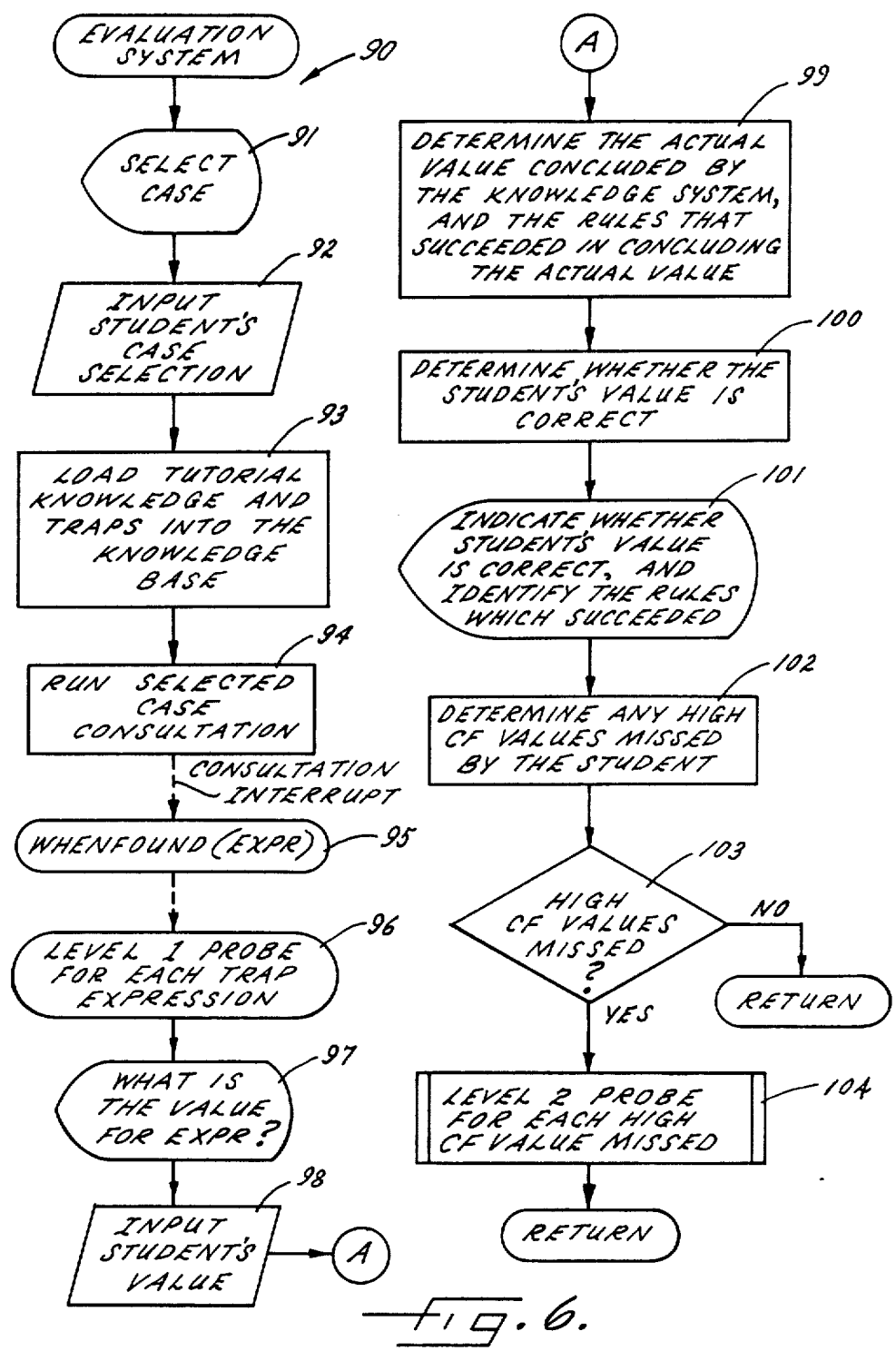
FIG. 6 is a flowchart of an evaluation system that implements the evaluation procedure.

Turning now to FIG. 6, there is shown a flowchart generally designated 90 for the control procedure for the evaluation system. This flowchart should be viewed in connection with the input-output listing of APPENDIX V. As shown in the input-output listing, the evaluation system is loaded into the knowledge base of the knowledge system shell by typing the command "load kbtutor.kb".

In the first step 91 of the flowchart 90, the student is told to select a case, and in step 93 the student's selection is received. In the input-output listing of the APPENDIX V, for example, the student selects the case "wine" by typing the command "teach wine". Then, in step 93, the selected case file of tutorial knowledge and traps are loaded into the knowledge base. Next, in step 94, a consultation is run using the selected case. In the input-output listing of APPENDIX V, the selected case is run by typing the command "restart" which results in an interactive consultation between the student and the knowledge system. During this conseltation, the student indicates that the main component of the meal includes meat, the meal does not have veal in it, the meal has a sauce on it, and sauce for the meal is tomato.

A consultation interrupt occurs when the inference engine finds the values of the expression "best-color". In step 95 this expression is matched with a "when-found" statement including the expression "best-color". Therefore, in step 96, a "level one" probe is initiated pertaining to the "best-color" expression.

In step 97, the student is asked for the value of the trap expression. The student is asked, for example, What do you recommend for the best-color?"Then, in step 98, the student's value is received. In step 99, the actual value concluded by the knowledge system is determined, along with the rules that succeeded in concluding the actual value. Next, in step 100, the evaluation system determines whether the student's value is correct. In step 101, the evaluation system indicates whether the student's value is correct and may identify the rules which succeeded.

As shown in the input-output listing of APPENDIX V, the student correctly recommend that the best-color was red, and therefore the evaluation system responded, " Good, the expert concluded that the best-color is red."

Next, in step 102, the evaluation system determines whether any high confidence factor values were missed by the student. If not, then as tested in step 103, execution returns. Otherwise, execution continues in step 104 by performing a "level 2" probe for each high confidence factor value missed by the student.

Turning now to FIG. 7, there is shown a flowchart generally designated 110 of a level 2 probe for a missing factor. In the first step 111, the student is asked for the factors which support the missing value. In the input-output listing of APPENDIX V, the level 2 probe is illustrated by a consultation interrupt occuring when the values for the expression "best-body" are found. In the level 1 probe, the evaluation system asks, "What do you recommend for the best-body?" The student responds incorrectly with the value of "light". The evaluation system replies, "No, the expert didn't conclude that the best-body is light. You should also have concluded that the best-body is medium, full."

In step 112, the evaluation system receives the student's justification for the missed value. In step 113, the student's justification is compared with the actual factors used by the rules to conclude the high confidence factor value that was missed. Then in step 114, the evaluation system indicates to the student whether his value was correct and identifies the rules mentioning any missed factors. In step 115, execution returns if any factors were missed. Otherwise, in step 116, a level 3 probe is performed for each missing factor.

Turning now to FIG. 8, there shown a flowchart generally designated 120 of a level 3 probe. This flowchart should be viewed in connection with the input-/output listing in APPENDIX VI. In the first step 121, the student is asked for the value of the missed factor. In the input/output listing of APPENDIX VI, for example, the student incorrectly recommends that the best-color is white, and omits the factor main-component after being told that his recommendation was wrong and after being asked to choose which factors support the correct recommendation that best-color is red. The student is therefore told that rule 9 also mentions main-component. Since the student omits an important factor that supports the correct conclusion, a level three probe occurs. The evaluation system probes the student for the value of the missed factor main-component by asking, "What main-component is consistent with red?"

Next, in step 122, the evaluation system receives the student's value for the missed factor. In step 123, the evaluation system determines the actual value used for the factor by the knowledge system, and also determines a rule which mentions the factor with this value. Finally, in step 124, the evaluation system indicates whether the student was correct and identifies the rules mentioning the factor with the correct value.

In the input/output listing of APPENDIX VI, for example, the student gives an incorrect value of "fish" for the factor "main-component". The evaluation system therefore tells the student that he is incorrect and says that rule 9 mentions meat and poultry, which are the correct values for "main-component". This completes the description of the evaluation system. Further features and advantages of the evaluation system and the authoring system are illustrated by the input/output listings of APPENDICIES IV to VI and are described by the comments in APPENDICIES II to VI.

In view of the above, there has been described a practical domain-independent tutor shell accepting the knowledge base of a consultation system and providing instruction tailored to the subject domain and the needs of the student. For easily accepting domain-dependent tutoring knowledge from a user, the domain knowledge base is analyzed for possible interrupt conditions or traps which may occur during a test consultation. From these possible traps, the user selects a subset which transparently encodes domain-dependent tutoring knowledge without the use of rules. The instruction is therefore easily tailored to the subject domain and the needs of the student by appropriately selecting the trap expressions and the test cases. The trap expressions and the test cases are, for example, stored in a case library, and the cases could be ranked, for example, in order of increasing difficulty and student experience level. By writing the knowledge-based tutor in an extensible knowledge base language, the rule analysis, consultation interrupts, and evaluation can be provided with a minimum of programming in addition to that provided by the knowledge system shell for the consultation system. Moreover, the computer execution time during a consultation interrupt is substantially decreased by compiling and indexing portions of the domain knowledge base which relate to the interrupt conditions.

APPENDIX I

Glossary artificial intelligence: A subfield of computer science concerned with the concepts and methods of symbolic inference and the symbolic representation for the knowledge to be used in making inferences and solving problems using a computer.

backtracking: A search procedure that makes guesses at various points during problem solving and returns to a previous point to make another choice when a guess leads to an unacceptable result.

backward-chaining: A reasoning strategy produced by the combination of rule-based representation, modus ponens inference, and goal-directed control. In this strategy, a chain of inferences is constructed starting with a rule whose conclusion would provide a solution to the problem. Then the system works backward to establish the premise of the rule. Attempts to establish the premise of any rule lead backward to the conclusions of other rules. In an exhaustive backward-chaining system, all possible rules are examined to arrive at a result.

bind, binding, bound: A variable is bound when it is assigned a value. A variable's binding is its attachment to a value. In some systems, variables may be bound, unbound, and then bound again through the process of backtracking.

cache: In a computer system, storage which is accessed quickly. Cache storage is managed so that most-often-used entries are readily available. In M.1 the cache is the repository of all conclusions made in a consultation.

certainty factor (CF): A number representing the confidence placed by a user or knowledge system in the validity of a proposition, hypothesis or rule. Ordinarily the number is not interpreted as a probability but rather as a subjective index of the truth of a proposition. Confidence, confidence factor, cf, CF, certainty, and certainty factor are all terms used interchangeably. In "M.1" (Trademark), certainty factors range from 0 to 100 (indicating no certainty to absolute certainty).

computer aided instruction (CAI): The use of interactive computer programs for instigating and controlling learning, preferably by presenting lessons that are optimized for each student.

consultation: A question-and-answer session with a knowledge system.

consultation system: A knowledge system which advises a user in a way which parallels the way a human consultant advises a client. In consultation mode, the system works to satisfy a goal. It searches the knowledge base for rules that lead to the goal conclusion and it invokes these rules. While in this mode, the system may ask questions of the user.

expert: A human who can solve problems or perform actions requiring unusual or uncommon skill. The expert's skills may evolve slowly, and usually require extensive knowledge and lengthy experience. See, also, "expertise."

expert knowledge: See "expertise."

expertise: The set of capabilities that underlies the high performance of human experts, including extensive domain knowledge, heuristic rules that simplify and improve approaches to problem-solving, metaknowledge, and compiled forms of behavior that afford great economy in skilled performance. Expert knowledge is rare, seldom explicit or measurable, and difficult to communicate or acquire. Gained through experience, long periods of training, apprenticeship and observation, it may be organized in subtle and idiosyncratic ways.

expert system: A knowledge system that performs at or near the level of human experts. The system achieves high levels for performance in task areas that, for human beings, require years of special eduction and training.

explanation: Motivating, justifying, or rationalizing an activity by information about goals sought or heuristic rules applied during the course of the activity.

fact: Assertion, proposition, or belief. See "proposition."

goal: The result or achievement toward which effort is directed. In a knowledge system, a goal is an expression for which a value is being sought.

goal-directed control/inference/reasoning: A control strategy often used for consultation systems. Candidate solutions to a problem are considered and evidence is gathered to determine whether each is acceptable. See, also, "backward-chaining."

heuristic: A rule of thumb, strategy, trick, simplification, or any other kind of device which drastically limits search for solutions in large problem spaces. Heuristics do not guarantee optimal solutions; in fact, they do not guarantee any solution at all. But a heuristic offers solutions which are good enough most of the time.

ICAI: See "intelligent computer-aided instruction:

if-then rule: A rule that takes the form: if [premise]-then [conclusion]. A certainty factor may be associated with the rule itself. See also "rule."

inference: The process of deriving new propositions from known ones. Examples of inference are modus ponens and inheritance.

inference engine: That portion of a knowledge system which reasons over the knowledge base to arrive at conclusions. The inference engine explains how and why it arrives at a conclusion or asks for information. It also manages the inheritance and the propagation of certainty factors.

inference tracer: A trace facility provided by M.1 for the knowledge engineer. The tracer displays facts and rules as they are invoked. It also displays values of logical variables.

inheritance: A type of inference mechanism common in frame-based representation schemes in which new facts are inferred from other facts within a hierarchy of elements.

intelligent computer-aided instruction: Computer-aided instruction (CAI) using a knowledge system incorporating problem solving expertise, a student model, and tutoring strategies. The problem solving expertise is the knowledge that the system tries to impart to the student. The student model is used to indicate what the student does and does not know. The tutoring strategies specify how the system presents material to the student.

invoke: The process of testing a rule. When the rule is tested, the inference engine seeks to find whether the rule is true in a particular instance. Invocation includes testing of each of the premises in the rule plus asserting any conclusions drawn by that rule.

knowledge: Propositions and heuristic rules. Those kinds of data that can improve the efficiency or effectiveness of a problem solver. Knowledge can be distinguished in many dimensions such as: symbolic vs. numeric, factual vs. heuristic, imperative vs. declarative, deep vs. shallow.

knowledge acquisition: The extraction and formulation of knowledge derived from current sources, especially from experts. The activity of transferring or transforming the knowledge and skills from a human expert or other knowledge source into a form usable by a knowledge system. Knowledge acquisition often involves chunking or parsing an expert's knowledge into a collection of if-then rules.

knowledge base: The portion of a knowledge system that contains propositions and heuristics about the domain.

knowledge base entry: A knowledge base entry is a single statement in the knowledge base. This statement may be a rule, a proposition, or other forms.

knowledge-based interpreter: That portion of a knowledge system capable for applying knowledge in the knowledge base to solve problems. The knowledge base interpreter typically includes an inference engine for reasoning over the knowledge base to arrive at conclusions, and also responds to propositions or commands in the knowledge base which modify the operation of the inference engine.

knowledge-based system: See "knowledge system."

knowledge engineer: A person who builds knowledge systems. A knowledge engineer is an expert at applying artificial intelligence methodoligies to create computer programs that solve complex problems. During this activity the knowledge engineer transfers expertise from knowledge sources into knowledge systems.

knowledge engineering: The process of formalizing symbolic knowledge with the intent of later applying it to solve hard problems automatically. The art or activity of designing and building knowledge systems.

knowledge engineering tools: Programming systems that simplify the work of building knowledge systems. The software provides (in its design) answers to the fundamental questions about what kind of inference engine, what kind of knowledge base, and what kind of control to utilize in building a knowledge system.

knowledge system: An intelligent computer system that uses knowledge and inference procedures to solve difficult poblems. The knowledge system includes a knowledge base encoding knowledge about a subject domain, and a knowledge base interpreter capable of applying the knowledge in the knowledge base to solve specified problems pertaining to the subject domain.

meta: A prefix which when attached to a term indicates that the term is used reflexively. In computer science, this prefix implies recursion. A meta-rule, for example, is a rule which guides the selection and execution of rules.

modus ponens: An inference mechanism in which a fact matching the premise of a rule is used to assert the conclusion of the rule.

PROLOG: A programming language used to create knowledge systems and knowledge engineering tools. The name comes from "programming in logic."

proposition: Fact, belief, or assertion. A proposition is a statement that can be proved either true or not true. The premises and conclusions of rules are propositions. Propositions not only appear in rules, but also stand alone as knowledge base entries.

rule: A pair, composed of an antecedent condition (known as the premise) and a consequent proposition (known as the conclusion), which can support deductive processes such as backward-chaining and forward-chaining. Most rules are of the form: "if [premise]then [conclusion]." The premises and conclusions are made up of propositions. A rule-based system is a system employing if-then rules in its representation of knowledge.

symbolic programming: Manipulating symbols that represent objects and relationships.

APPENDIX II   COPYRIGHT 1987 TEKNOWLEDGE, INC. All Rights Reserved

```
/* This file is the "AUTHOR" shell which initializes pointers
that will be used during a tutorial.  They are:

rulesfor(EXP)      -- list of rules that conclude about EXP
    factorsfor(EXP)    -- expressions appearing in rule premises
                          that conclude about EXP
    valsfor(EXP)       -- values concluded about EXP in some
                          rule (without cfs)
    numeric(EXP)       -- true if expression has numeric values rulevarfactor(R)   -- factor referenced by premise that sets conclusion var
    rulevardependson(R) -- association list of vars and factors that
                          set the vars in rulevarfactor
    premise-assigns-vars(R) -- true if any premise clause assigns a variable
    control-rule(R)    -- true if rule uses "do" or "display"

Code also exists to compute the following, but they are not
    currently stored for use by the tutor:

conclvals(RULE)    -- conclusions made by a rule (without cfs)
    negconclvals(RULE) -- negative vals
    posconclvals(RULE) -- positive vals Currently, this code is run by loading this file and giving the
command, "author" with the knowledge base name as an argument.
For example, "author wine".
The teacher is asked which expressions should be trapped; the above
pointers are then set for these expressions.

In this file, the proposition "hide(EXP)" is used to mark
expressions concluded by rules which shouldn't be confused with
the domain knowledge base being analyzed.

/************************ DECLARATIONS ****************************/

/*  Everything is "nocheck" to allow expressions with vars
to be sought and concluded */ nocheck(X).

/********************** COMMANDS ******************************/ command(author(KB))=[
    display(['Loading the ',KB,' knowledge base...']) and
    do(loadz KB) and
    display(['done.',nl]) and
    traps-set is sought and
    savefile and
    stringjoin(['t',KB,'.kb'])= STRING2 and
    termof(STRING2) = PTRKB and
    display('Saving the trap and pointer kb...') and
    do(savechanges PTRKB) and
    display(['done.',nl,nl,
    'To run the tutor in a fresh M.1, load kbtutor.kb,',nl,
    'and give the command, teach ',KB,.,nl,nl])
    ].

/* This command will save a case file.  */ command(savecase( FILE )) = [
cached(E = V cf CF because 'you said so') and
display(FILE,[E,' = ',V,' cf ',CF,' because ',
            '''you said so''.',nl]) and
1 = 0].
```

/****************** ARITHPROPOSITION ****************************/

/* Indicates whether a proposition is arithmetic, does not include
   expr = V where expr is a numeric-valued kb expression */ noautomaticquestion(arithproposition(X)).
nocache(arithproposition(X)).
hide(arithproposition(X)).

arithproposition(E > V).
arithproposition(E < V).
arithproposition(E >= V).
arithproposition(E =< V).
arithproposition(E <= V).

if numericfunction(E)    /* a built-in numeric function */
then arithproposition(E = V).

if numericcomputation(E)   /* an expression with numeric operators */
then arithproposition(E = V).

/****************** CONCLVALS ****************************/

/* values of expression concluded by rule. Allow cache, user will
   reset. */ hide(conclvals(R)).

if listof(X,cv(RULE) = X) = LST and
   not(LST == [])
then conclvals(RULE) = LST.

if conclvals(RULE) is unknown and
   display(['Error: Unable to determine conclusions of ',RULE])
then conclvals(RULE) = [].

/****************** CONJUNCTS ****************************/

/* clauses of rule */

/* Special cases for conjuncts rules reflect how
   connectives (or/and) bind in matching. Not sure why first
   rule requires the screen for an or clause */ nocache(conjuncts(X)).
hide(conjuncts(X)).

if STRUCTURE == (P and Q) and
   not P == (R or S) and
   conjuncts(Q) = LST
then conjuncts(STRUCTURE) = [P|LST].

if STRUCTURE == (P or Q) and
   conjuncts(Q) = LST
then conjuncts(STRUCTURE) = [P|LST].

if STRUCTURE == (P or Q and R) and
   conjuncts(Q) = LST1 and
   conjuncts(R) = LST2 and
   union(LST1, LST2) = LST
then conjuncts(STRUCTURE) = [P|LST].

if STRUCTURE == P
then conjuncts(STRUCTURE) = [P].

```
if conjuncts(STRUCTURE) is unknown and
    display(['Error: Unable to determine conjuncts in ',
    STRUCTURE])
then conjuncts(STRUCTURE) = [].

/******************** CV *********************************************/

/* temporary storage for values concluded by rule */ nocache(cv(RULE)).
multivalued(cv(RULE)).
hide(cv(R)).

if kbentry(L:if P then E about E)
then cv(L) = yes.

if kbentry(L:if P then E = V1 and E = V2)
then cv(L) = V1 and
     cv(L) = V2.

if kbentry(L:if P then E = V1 cf CF1 and E = V2 cf CF2 and E = V3 cf CF3)
then cv(L) = V1 cf CF1 and
     cv(L) = V2 cf CF2 and
     cv(L) = V3 cf CF3.

if kbentry(L:if P then E = V1 cf CF1 and E = V2 cf CF2)
then cv(L) = V1 cf CF1 and
     cv(L) = V2 cf CF2.

if kbentry(L:if P then E = V cf CF)
then cv(L) = V cf CF.

if kbentry(L:if P then E = V)
then cv(L) = V.

/******************** DREMDUPLS *********************************************/

/* list with duplicates removed */ nocache(dremdupls(ANYLIST)).
hide(dremdupls(L)).
whenfound(dremdupls(L) = ANY) = do(reset dremdupls1(L)).

/* whenfound/reset replaces not caching dremdupls1, wh/ appears to
   be slower than necessary */

/* We use the trick of having M.1 collect the members of the list
for us, uniquely, as a set of values, which we extract using
listof. */
if listof(dremdupls1(L)) = LST
then dremdupls(L) = LST.

/****************** DREMDUPLS1 *******************************************/ hide(dremdupls1(X)).
multivalued(dremdupls1(X)).

if member(L) = E
then dremdupls1(L) = E.

/******************** EXPRESSION *********************************************/

/* extracts expression ("factor") from a rule clause */

/* In general, no cf is allowed in the clause, e.g.,
    E = V cf CF is not allowed */
```

```
nocache(expression(X)).
hide(expression(X)).

if TERM == listof(E) = X     /* We don't allow listof(V, PROP) */
then expression(TERM) = E.

if TERM == mostlikely(E) = X
then expression(TERM) = E.

if TERM == cached(EXPR) and   /* messy, but factor is well defined */
    expression(EXPR) = E
then expression(TERM) = E.

if TERM == ordered(E) = X
then expression(TERM) = E.

if TERM ==.E = V    /* NB: This must come after above or it'll match them */
then expression(TERM) = E.

if TERM == E is X
then expression(TERM) = E.

if TERM == (not EXPR) and
    expression(EXPR) = E
then expression(TERM) = E.

if TERM == E     /* otherwise, return the whole proposition/clause */
then expression(TERM) = E.

/**************** FACT ******************************************/ nocache(fact(F)).
hide(fact(F)).

if stringof(V) = STRNG and
    fact1(STRNG) = VALUE   /* Kludge to avoid having vars in V bound by match */
then fact(V) = VALUE.

/****************** FACT1 *******************************************/

/* cf N is necessary to recognize facts that aren't definite */
nocache(fact1(F)).
hide(fact1(F)).

if termof(S) = V and
    kbentry(V = ANYTHING cf N) or kbentry(V = ANYTHING)
then fact1(S) = ANYTHING.

/****************** FACTORSFOR **************************************/

/* factors in premises of rules concluding about expression;
facts are excluded */ nocache(factorsfor(X)).
hide(factorsfor(X)).

whenfound(factorsfor(X) = LST) = do(addz factorsfor(X) = LST).

if listof(factorsfor1(EXP)) = LST  /* collects without duplicates */
then factorsfor(EXP) = LST.

/**************** FACTORSFOR1 ***********************************/ nocache(factorsfor1(X)).
multivalued(factorsfor1(X)).
hide(factorsfor1(X)).
```

```
if rulesfor(EXP) = RULES and
   member(RULES) = R and
   rulefactors(R) = FACTORS and
   member(FACTORS) = F and
   not fact(F) = ANY
then factorsfor1(EXP) = F.
```

/****************** FOUNDVARFACTOR ****************************/

/* Used as a switch when analyzing a rule to determine the clauses
   that appear before the one mentioning VARFACTOR.  Once established
   for some FACTOR, it's true for all others. */

```
hide(foundvarfactor(X,Y,Z)).

if FACTOR == VARFACTOR
then foundvarfactor(R,FACTOR,VARFACTOR).

if cached(foundvarfactor(R, X, VARFACTOR))   /* already established */
then foundvarfactor(R, FACTOR, VARFACTOR).
```

/******************* HAS-LHS-VAR ******************************/

/* Rule R has a variable in its lefthand side if the instantiated
   expression is not equal to the expression the rule is about */

```
nocache(has-lhs-var(R, X)).
hide(has-lhs-var(R, X)).

if kbentry(R: if P then Q about EXPR) and
   stringof(EXPR) = SEXPR and
   stringof(INSTEXPR) = SINSTEXPR and
   not SEXPR == SINSTEXPR    /* Strings avoid automatic unification */
then has-lhs-var(R, INSTEXPR).
```

/****************** INITIALIZED ******************************/

/* Analyzer for expressions to be trapped */

```
hide(initialized(X)).

if display(['Reading the rules for ',EXP,'...']) and
   factorsfor(EXP) = FACTORS and
   valsfor(EXP) is sought and
   initialized-factors(FACTORS) is sought and
   do(addz whenfound(EXP = VALUE) = [whenfoundtutor(EXP)] ) and
   display(['done.',nl,nl])
then initialized(EXP).

if initialized(EXP) is unknown and
   display(['Error: Trap not set for ', EXP,nl])
then initialized(EXP) = no.
```

/*************** INITIALIZED-FACT ****************************/

/* if appropriate, determines vars in R affecting instantiation of F */

```
hide(initialized-fact(F,R)).

if fact(F) = ANY and
   not(numeric(F)) and
   rulevardependson(R) is sought
then initialized-fact(F, R).
```

/****************** INITIALIZED-FACTORS ***************************/

/* analyzer for factors in rules to be discussed (rules
   concluding about expressions to be trapped) */ nocache(initialized-factors(X)).
multivalued(initialized-factors(X)).
hide(initialized-factors(X)).

if member(FACTORS) = FACTOR and
   valsfor(FACTOR) is sought
then initialized-factors(FACTORS).

/****************** INSTANTIATED-CONCLVALS **********************/ nocache(instantiated-conclvals(R,X)).
hide(instantiated-conclvals(R,X)).

whenfound(instantiated-conclvals(R,X) = ANY) = [do(reset conclvals(R))].

/* INSTEXPR is an expression which might be partially instantiated
   according to the environment of the rule in which it is used;
   it is concluded by rule R, which might have vars on the LHS or RHS
   of its action */

/* Simplest case is action value that's not a var */ if not varconcl(R) and
   conclvals(R) = LST
then instantiated-conclvals(R, INSTEXPR) = LST.

/* In the following case, the factor determining the conclusion value
is the same as the conclusion expression. This rule therefore doesn't
contribute new vals, they must come from other rules or by asking. */ if varconcl(R) and
   rulevarfactor(R) = F and
   F == INSTEXPR and /* conclval is copied from same expression */
   display(['Noted that ',R,' is self-referencing...'])
then instantiated-conclvals(R, INSTEXPR) = [].

/* Routine case where var is set by a proper factor */ if varconcl(R) and
   rulevarfactor(R) = F and /* Factor that determines conclusion var */
   initialized-fact(F, R) is sought and /* good time to do this */
   instantiated-factor(F, R, INSTEXPR) = INSTF and /* fill in F's vars */
   valsfor(INSTF) is sought and
   numeric(INSTF) and /* Surprise! discovered that the factor has
                        numeric values */
   display(['Noted that value concluded by ',R,' is numeric.',nl]) and
   kbentry(R: if P then E = V about E) and
   do(set numeric(E)) /* now we know */
then instantiated-conclvals(R, INSTEXPR) = [].

/* Vanilla case where the factor has non-numeric values, just what we
   wanted to find out, the values this rule could conclude */ if varconcl(R) and
   rulevarfactor(R) = F and
   instantiated-factor(F, R, INSTEXPR) = INSTF and
   valsfor(INSTF) = VALS
then instantiated-conclvals(R, INSTEXPR) = VALS.

/* Common case where lhs of clause is a numeric expression */

```
if varconcl(R) and
   rulevarfactor(R) is unknown and
   rulevarexpr(R) = EXPR and   /* found the clause, but the lhs is not
                 a factor (concluded by rules, facts, or asking) */
   numericexpr(EXPR) and  /* it's a numeric expression */
   display(['Noted that value concluded by ',R,' is numeric.',nl]) and
   kbentry(R: if P then E = V about E) and
   do(set numeric(E))  /* now we know */
then instantiated-conclvals(R, INSTEXPR) = [].

/* An error: */ if varconcl(R) and
   rulevarexpr(R) = EXPR and
   display(['Can''t interpret: ',EXPR,' in ',R,nl,
     'Possible typo or missing facts, rule, or question to infer it.',nl])
then instantiated-conclvals(R, INSTEXPR) = [].

if varconcl(R) and
   display(['Error: Unable to find clause that sets variable',nl,
     'on action rhs of ',R,nl])
then instantiated-conclvals(R, INSTEXPR) = [].

/**************** INSTANTIATED-FACTOR **************************/ hide(instantiated-factor(X,Y,Z)).

/* If rule R has a variable in the expression on the lhs of its
   conclusion, then F, a factor, might use these variables too.  It
   is instantiated by defining a temporary fact.  Won't be fully
   instantiated if F includes vars set by other clauses. */ if has-lhs-var(R,INSTEXPR) and
   kbentry(R:if P then Q about EXPR) and
   do(adda tempfact: inst(EXPR) = F) and
   do(reset inst(ANY)) and
   inst(INSTEXPR) = INSTF and   /* essentially copies over expr vars into
                                   factor */
   do(remove tempfact)
then instantiated-factor(F,R,INSTEXPR) = INSTF.

instantiated-factor(F, X, Y) = F.

/****************** KBEXPR ****************************************/

/* kbexpr is true if expression is concluded by asking
   or applying rules; that is, it is a proper knowledge
   base expression, not a meta-proposition. */ nocache(kbexpr(X)).
hide(kbexpr(X)).

/* Unfortunate kludge required to keep vars in V from being
   rebound */ if stringof(V) = STRNG and
   kbexpr1(STRNG)
then kbexpr(V).

if V == do(X) and
   display(['Warning: ''do'' may prevent discussing rule.',nl])
then kbexpr(V) = no.

if V == listof(X,Y) = Z and
   display(['Error: Cannot use ""listof(var,prop)"" in a rule to be taught',
            nl,'Rewrite using an intermediate expression & rule',nl,
             'Offending clause: ',V, ' Will be ignored.',nl])
```

```
then kbexpr(V) = no.

if V == display(X) and
    display(['Warning: ''display'' may prevent discussing rule.',nl])
then kbexpr(V) = no.

if kbexpr(V) is unknown and
    display(['Warning: Factor not found; ignoring ', V,nl])
then kbexpr(V) = no.

/****************** KBEXPR1 *********************************/

/* Kludge to keep vars in term from being rebound */ hide(kbexpr1(X)).
nocache(kbexpr1(X)).

if termof(S) = V and
    kbentry(legalvals(V) = X)
then kbexpr1(S).

if termof(S) = V and
    kbentry(question(V) = X)   /* This V lacks legalvals */
then kbexpr1(S).

if termof(S) = V and
    kbentry(if P then Q about V)
then kbexpr1(S).

if termof(S) = V and
    kbentry(V = ANYTHING cf N) or kbentry(V = ANYTHING) /* it's a fact! */
then kbexpr1(S).

/********************* NUMBERP ********************************/

/* Value is a number */ nocache(numberp(X)).
hide(numberp(X)).

if stringof(V) = STRG and
    substring(0,1,STRG) = FIRSTCHAR and
    ["-","0","1","2","3","4","5","6","7","8","9"] == DIGITCHARS and
    member(DIGITCHARS) = FIRSTCHAR
then numberp(V).

/******************** NUMERIC **********************************/

/* Determines whether an expression is numeric by looking at legalvals
   and facts. Does not examine rules, so is not guaranteed to be
   correct. When examining rules in "instantiated-conclvals", we'll
   cache "numeric" if we find that the var in the action is set by
   a numeric expression. Use whencached to catch such opportunistic
   discoveries. */ hide(numeric(E)).
whencached(numeric(E) = yes) = [do(addz numeric(E))].

if numericfact(E)
then numeric(E).

if numericlegalvals(E)
then numeric(E).
```

```
/********************** NUMERICCOMPUTATION *****************************/

/* Detects a term with numeric operators, such as SQ/L */ hide(numericcomputation(X)).
nocache(numericcomputation(X)).

if stringof(E) = STRG and
   ["*","/","+"," - "] == NUMERICOPS and  /* use spaces around - to avoid
                        confusion with a hyphen in a term */
   member(NUMERICOPS) = OP and
   stringindex(1,OP,STRG) = N   /* Contains a numeric operator */
then numeriecomputation(E).

/********************** NUMERICDECL *****************************/

/* Legalval declarations that indicate a numeric expression */ noautomaticquestion(numericdecl(X)).
nocache(numericdecl(X)).
hide(numericdecl(X)).

numericdecl([yes,no]) = no.  /* common case, so catch it to save time */ numericdecl(integer).
numericdecl(real).
numericdecl(number).
numericdecl(integer(X,Y)).
numericdecl(real(X,Y)).
numericdecl(number(X,Y)).

/********************** NUMERICEXPR *****************************/

/* Examines an expression from the lhs of a proposition to determine
   if it has a numeric value */ hide(numericexpr(E)).
nocache(numericexpr(E)).

if numeric(E)
then numericexpr(E).

if numericfunction(E)
then numericexpr(E).

if numericcomputation(E)
then numericexpr(E).

/********************** NUMERICFACT *****************************/

/* Expression is a fact in the kb with numeric values */ hide(numericfact(E)).
nocache(numericfact(E)).

if fact(E) = ANY and  /* just look at the first entry */
   numberp(ANY)
then numericfact(E) = yes.

/******************** NUMERICFUNCTION ***************************/ noautomaticquestion(numericfunction(X)).
nocache(numericfunction(X)).
hide(numericfunction(X)).

numericfunction(fix(X)).
```

```
numericfunction(float(X)).
numericfunction(real_round(X)).
numericfunction(sqrt(X)).
numericfunction(truncate(X)).
```

/******************* NUMERICLEGALVALS *****************************/

/* Legalvals of the expression are numbers; assumes that if values
   can be numeric and are listed, the first will be numeric */

```
nocache(numericlegalvals(X)).
hide(numericlegalvals(X)).

if kbentry(legalvals(E) = VAL about E) and
   numericdecl(VAL)       /* Simple, obvious declaration says so */
then numericlegalvals(E).

if kbentry(legalvals(E) = [FIRST|REM]) and
   not numberp(FIRST)     /* First entry in a list is not numeric */
then numericlegalvals(E) = no.

if kbentry(legalvals(E) = [FIRST|REM]) and
   numberp(FIRST)         /* First entry in the list is numeric */
then numericlegalvals(E) = yes.
```

/******************* RHS *******************************************/

/* Value is the string corresponding to the variable on the rhs of a
   clause with form (EXP = VAR). The iteration is required in order
   to skip over embedded equal signs, such as in listof(v,p). We
   use strings rather than direct matching so we can grab the actual
   var in the clause. */

```
hide(rhs(X)).
nocache(rhs(X)).

if stringof(Q) = STRG and
   positiveinteger = N and
   stringindex(N,' = ',STRG) = EQPOS and
   N + 1 = M and
   not stringindex(M,' = ',STRG) = ANY and  /* This is the last = */
   EQPOS+3 = VARPOS and
   substring(VARPOS,end,STRG) = S2
then rhs(Q) = S2.
```

/******************* RULE-CONCLUDED-EXPRS *********************/

/* Analyzer for entire kb to determine possible traps */

```
hide(rule-concluded-exprs).

if display(['Analyzing the knowledge base for',nl,
   'expressions concluded by rules...']) and
   listof(rule-expr) = LST and  /* gather into a list */
   display(['done.',nl])
then rule-concluded-exprs = LST.
```

/******************* RULE-EXPR *********************************/

/* Determines expressions concluded by rules */

```
nocache(rule-expr).
multivalued(rule-expr).
hide(rule-expr).
if kbentry(if P then Q about EXP) and
   not kbentry(hide(EXP))
then rule-expr = EXP.
```

/************************* RULEFACTORS ******************************/

/* Collects factors in a rule premise and saves in kb. Also cache
   it because it is referenced in several places. */ hide(rulefactors(R)).

whenfound(rulefactors(R) = LST) = do(addz rulefactors(R) = LST).

/* Following is a somewhat inelegant way of noting global properties
   of the rule. Could be rewritten as separate expressions to seek,
   but this has the advantage of gathering considerations in one place. */ whenfound(rulefactors(R)) = [cached(term-uses-var(R,ANY)) and
                             do(addz premise-assigns-vars(R))].

whenfound(rulefactors(R)) = [cached(term-uses-command(R,ANY)) and
                             do(addz control-rule(R))].

whenfound(rulefactors(R)) = [cached(term-uses-command(R,ANY)) and
                             cached(term-uses-var(R,ANY)) and
   display(['Error: Variables in ',R,'won''t be instantiated during',nl,
   'teaching in order to avoid "do" and/or "display" side-effects.',nl])].

whenfound(rulefactors(R)) = [do(reset term-uses-var(R,ANY)) and
                             do(reset term-uses-command(R,ANY))].

if listof(rulefactors1(RULE)) = LST /* collect without duplicates */
then rulefactors(RULE) = LST.

/********************* RULEFACTORS1 ******************************/ multivalued(rulefactors1(R)).
nocache(rulefactors1(R)).
hide(rulefactors1(R)).

if kbentry(RULE:if PREM then ACT) and
   display([RULE,'....']) and
   conjuncts(PREM) = PROPS and
   member(PROPS) = TERM and
   term-uses-var(RULE,TERM) is sought and  /* do here since we have a
                                              handle on the rule name */
   term-uses-command(RULE,TERM) is sought and
   not arithproposition(TERM) and /* ignore clauses like E > V */
   expression(TERM) = EXP and /* extract the lhs */
   kbexpr(EXP)  /* its a fact, requested, or concluded by rules */
then rulefactors1(RULE) = EXP.

/************* RULESFOR ******************************/ hide(rulesfor(X)).
/* cache this since it is reused several times */ whenfound(rulesfor(X) = LST) = do(addz rulesfor(X) = LST).

if listof(L,kbentry(L:if P then Q about EXP)) = LST and
   not(LST = [])
then rulesfor(EXP) = LST.

/******************* RULEVARDEPENDSON ******************************/

/* Construct association list of vars and factors that appear in
   rule R before the factor that determines its conclusion, VARFACTOR */ hide(rulevardependson(R)).
nocache(rulevardependson(R)).

```
whenfound(rulevardependson(R) = LST) = do(addz rulevardependson(R) = LST).

if kbentry(R: if P then Q) and
   conjuncts(P) = PROPS and
   rulevarfactor(R) = VARFACTOR and
   listof([STRINGVAR, FACTOR],
                   member(PROPS) = CLAUSE and
                   rhs(CLAUSE) = STRINGVAR and  /* do first to save var */
                   CLAUSE == FACTOR = V and     /* get factor */
                   V == yougottabekidding and   /* rhs IS a var */
                   not foundvarfactor(R,FACTOR,VARFACTOR)
                       /* haven't encountered VARFACTOR yet */) = LST
then rulevardependson(R) = LST.

/********************* RULEVAREXPR ************************************/

/* R is a rule with a variable conclusion.  Find the expression in the
   premise that sets this variable.  Assume only one. */ hide(rulevarexpr(R)).

if kbentry(R:if P then Q) and
   conjuncts(P) = PROPS and
   rhs(Q) = STRNGV and        /* var on rhs of the action */
   stringjoin([' = ',STRNGV]) = CLAUSE and
   member(PROPS) = PROP and
   stringof(PROP) = STRNGP and
   stringindex(1,CLAUSE,STRNGP) = N and  /* Found the clause that sets the
                                            var on the rhs of the action */
   substring(0,N,STRNGP) = EXPR and
   termof(EXPR) = TERM        /* Expression on lhs of this clause */
then rulevarexpr(R) = TERM.

/********************* RULEVARFACTOR ************************************/

/* The rulevarfactor is the factor in the rule's premise that sets
   the variable appearing on the rhs of the action.  Must cache it
   since it is referenced many times. */ hide(rulevarfactor(R)).

whenfound(rulevarfactor(R) = F) = do(addz rulevarfactor(R) = F).

if rulefactors(R) = FACTORS and
   rulevarexpr(R) = EXPR and
   member(FACTORS) = EXPR
then rulevarfactor(R) = EXPR.

/******************* SAVEFILE **********************************/ question(savefile) = 'Save trap and pointer file?'.
nocache(savefile).
hide(savefile).
legalvals(savefile)=[yes, no].

/********************* TERM-USES-COMMAND ************************************/

/* used in rulefactors1 when parsing rule, cached for making
   record in secondary kb after rulefactors are known */ hide(term-uses-command(R,X)).

if TERM == do(X)
then term-uses-command(RULE, TERM).

if TERM == display(X)
then term-uses-command(RULE, TERM).
```

/************************* TERM-USES-VAR **************************/ ie(term-uses-var(R,X)).

TERM == E = yougottabekidding
en term-uses-var(RULE, TERM).

/************************* TRAPS **************************/ imeratedanswers(traps).
:omaticmenu(traps).
:ache(traps).
ie(traps).
ltivalued(traps).
estion(traps) = ['Which expressions would you like the',nl,
itor to discuss with the student?'].

/************************* TRAPS-SET **************************/

Main control block for determining possible traps and
analyzing traps selected by the teacher */ ie(traps-set).
ltivalued(traps-set).
:ache(traps-set).

enfound(traps-set = ANY) = do(remove trapvals).

rule-concluded-exprs = LST and
do(adda trapvals: legalvals(traps) = LST) and
listof(traps) = TEACHERCHOICES and
member(TEACHERCHOICES) = CHOICE and
initialized(CHOICE)
en traps-set = CHOICE.

/************************* UNION **************************/

Simple set union, necessary because M.1's list operators lack
an append or nconc equivalent */

:ache(union(X,Y)).
ie(union(X,Y)).

listof(X,member(L1) = X or member(L2) = X) = LST
en union(L1,L2) = LST.

/************************* VALSFOR **************************/

Values for an expression concluded by rules;
assuming that X is fully instantiated.
Don't attempt this if X has numeric values.
Don't cache it because string values take up too much space!
But double check to avoid writing it twice.
Also, put at front of new kb, so it isn't recomputed. */

:ache(valsfor(X)).
ie(valsfor(X)).

enfound(valsfor(X) = LST)= [not kbentry(valsfor(X) = LST) and
                           do(adda valsfor(X) = LST) and
                           do(reset valsfor1(X)) ].

currently don't know why listof isn't removing duplicates here,
so need to do explicit dremdupls */ not numeric(X) and
listof(valsfor1(X)) = LST and

```
    not LST == [] and
    dremdupls(LST) = SIMPLELST
then valsfor(X) = SIMPLELST.
```

/******************** VALSFOR1 **************************/

/* Gather up values concluded by rules, legalvals, and facts */

```
multivalued(valsfor1(X)).
hide(valsfor1(X)).

if rulesfor(EXP) = RULES and
    member(RULES) = R and
    not numeric(EXP) and /* keep checking, might have just discovered
                this on the last rule, though there is usually just one */
    instantiated-conclvals(R, EXP) = VALST and  /* instantiate RHS */
    member(VALST) = V
then valsfor1(EXP) = V.

if kbentry(legalvals(X) = LST about X) and
    LST == [FIRST | REST] and /* it's a list, not a declaration */
    member(LST) = V
then valsfor1(X) = V.

if kbentry(X)
then valsfor1(X) = yes.

if kbentry(X = V)
then valsfor1(X) = V.

if kbentry(X = V cf N)
then valsfor1(X) = V.
```

/***************** VARCONCL *********************************/

/* Determines whether rule has a variable on the rhs of its conclusion */

```
hide(varconcl(R)).

if conclvals(R) = [VAR] and
    stringof(VAR) = 'VAR'  /* Value in action is a variable */
then varconcl(R).
```

/**************** CASEDATA *********************************/

/* Not currently used, intended for allowing tutor to
   prompt student for factors before determining an expression */

```
hide(casedata).
if listof(F, kbentry(question(X) = Y about F) and not hide(X)) = LST
then casedata = LST.
```

/***************** NEGCONCLVALS  POSCONCLVALS *****************/

/*************** These aren't currently needed:

```
hide(negconclvals(R)).
hide(posconclvals(R)).
if listof(X,ordered(cv(RULE)) = X cf CF and CF<20) = LST and
    not LST == []
then negconclvals(RULE) = LST.

if listof(X,ordered(cv(RULE)) = X) = LST and
    not LST == []
then posconclvals(RULE) = LST.
``` end of pos & neg conclvals  *************************/

APPENDIX III

/* Knowledge Base tutor */   COPYRIGHT 1987 TEKNOWLEDGE, INC. All Rights Reserved

/******************* DECLARATIONS *******************************/

/* This is generally only needed for rule factors in this module,
   and is put here to avoid unexpected errors. Might have to be
   selectively done in product version, to allow user checking in
   his developmental kb. */ nocheck(X).

/* Expressions put into the kb during the analysis phase */ noautomaticquestion(numeric(X)).
noautomaticquestion(rulevarfactor(R)).
noautomaticquestion(rulevardependson(R)).
noautomaticquestion(premise-assigns-vars(R)).
noautomaticquestion(control-rule(R)).

/* NB: Caching is used in this version mostly for debugging.
   Space restrictions may require extensive use of nocache in the
   released product. */

/******************* COMMANDS ***********************************/

```
command(teach(KB))= [
      display(['Welcome to KBT.1, the tutor for M.1 knowledge bases.'
                      ,nl,nl]) and
      display('Loading the knowledge base...') and
      do(loadz KB) and
      display(['done.',nl]) and
      stringjoin(['t',KB,'.kb'])= STRING2 and
      termof(STRING2) = KBNAME and
      display('Loading the trap and pointer kb...') and
      do(loada KBNAME) and  /* must put before both tutor (for kb facts)
                      and the kb (for duplicate whenfound's etc.) */
      display(['done.',nl,nl,
              'To run the tutor, use the go command.',nl,nl])
      ].

command(evidence(EXP)) = [listof(EXP) = VALS and
                  member(VALS) = V and
                  display('Evidence ') and
                  displaythevals(EXP,[V]) and
                  evidfor(EXP,V) = RULES and
                  member(RULES) = R and
                  rulefactors(R) = FACTORS and
                  display([R,': ']) and
                  displaylst(FACTORS) and
                  display(nl) and
                  O = 1].
```

/****************** ARITHPROPOSITION ****************************/

/* Indicates whether a proposition is arithmetic, does not include
   expr = V where expr is a numeric-valued kb expression.
   IDENTICAL TO CODE IN THE AUTHORING SHELL. */ noautomaticquestion(arithproposition(X)).
nocache(arithproposition(X)).
arithproposition(E > V).
arithproposition(E < V).
arithproposition(E >= V).
arithproposition(E =< V).
arithproposition(E <= V).

if numericfunction(E)   /* a built-in numeric function */
then arithproposition(E = V).

```
if numericcomputation(E)   /* an expression with numeric operators */
then arithproposition(E = V).
```

/**************** BADVALS *****************************************/

```
/* There are "bad values to report to the student" if
   there are wrong or missing answers. */ nocache(badvals(X,Y)).

if wrongvals(SVALS, ACTUALVS) is known
then badvals(SVALS, ACTUALVS).

if missingvals(SVALS,ACTUALVS) is known
then badvals(SVALS, ACTUALVS).
```

/**************** BOOLEAN *****************************************/

```
/* We check valsfor because there might not be an explicit legalvals.
   We check just for "yes" because this might be the only value and/or
   there might be "values" like "request-help" or "??" */ if valsfor(EXP) = X  and
   member(X) = yes
then boolean(EXP).
```

/**************** CLEANUP *****************************************/

```
/* Remove entries made to kb by whenfoundtutor; currently
   not invoked.  Should be done between cases. */ multivalued(cleanup(G)).

if do(remove temprule) and  /* rule used by instantiated */
   rulesfor(GOAL) = RULES and
   member(RULES) = R and
   listof(dual(R)) = NEWRULES and
   not NEWRULES == [] and
   member(NEWRULES) = NR and   /* set when R was instantiated */
   do(remove NR) and
   do(remove rulefactors(NR))
then cleanup(GOAL).
```

/**************** CONCLPROMPT *****************************************/

```
/* Prompt for a level 1 probe */ question(conclprompt(GOAL))=
['What do you conclude about the ',GOAL,?].
multivalued(conclprompt(X)).
automaticmenu(conclprompt(G)).
enumeratedanswers(conclprompt(G)).
```

/**************** CONJUNCTS *****************************************/

```
/* clauses of rule */
/* DUPLICATES CODE IN THE AUTHORING SYSTEM EXCEPT CACHES */

/* Special cases for conjuncts rules reflect how
   connectives (or/and) bind in matching. Not sure if
   2nd and 3rd rules could be reordered. Not sure it
   works if there are two or's.  */ if STRUCTURE == (P and Q) and
   not P == (R or S) and
   conjuncts(Q) = LST
then conjuncts(STRUCTURE) = [P|LST].
```

```
: STRUCTURE == (P or Q) and
  conjuncts(Q) = LST
ιen conjuncts(STRUCTURE) = [P|LST].

: STRUCTURE == (P or Q and R) and
  conjuncts(Q) = LST1 and
  conjuncts(R) = LST2 and
  union(LST1, LST2) = LST
:en conjuncts(STRUCTURE) = [P|LST].

: STRUCTURE == P
ιen conjuncts(STRUCTURE) = [P].

******************* COPYRULEPROPS ********************************/

R is an original kb rule, NEWR is a rule that instantiates it */

:ltivalued(copyruleprops(R,NEWR)).
ιcache(copyruleprops(R,NEWR)).

: rulevarfactor(R) = VARFACTOR and
  do(addz rulevarfactor(NEWR) = VARFACTOR)
ιen copyruleprops(R, NEWR).

: rulevardependson(R) = FACTORS and
  do(addz rulevardependson(NEWR) = FACTORS)
ιen copyruleprops(R, NEWR).

******************* CORRECTFACTORS ********************************/

Correct answers in response to level 2 probe are factors mentioned
  in succeeding rules */

: listof(SF,member(SFACTORS) = SF and mentioned(RULES,SF)) = CLST and
  not CLST == []
ιen correctfactors(SFACTORS, RULES) = CLST.

******************* CORRECTVALS ********************************/

: listof(SV, member(SVALUES) = SV and
             member(ACTUALVALUES) = SV) = LST and
  not(LST ==[])
.en correctvals(SVALUES, ACTUALVALUES) = LST.

******************* DISCUSSEDFACTORS ********************************/

Generates a level 2 probe and provides feedback */

: fprompt(EXP,VAL) = VALSTRING and   /* decide whether to mention VAL */
  listof(factorprompt(VALSTRING)) = SFACTORS and
  evidfor(EXP,VAL) = SUCCRULES and
  remediate-factors(EXP,VAL,SFACTORS,SUCCRULES) is sought
.en discussedfactors(EXP,VAL).

******************* DISCUSSEDFACTORVAL ********************************/

This is the entry point for a level 3 probe */

R concludes that EXP = VAL using FACTOR. Prompts
  Student for the value associated with this factor
  in the rule (ACTUALV) and gives feedback. */

: factorvalues(R,FACTOR) = ACTUALVALS and
  initialized-possible-factor-vals(FACTOR) and
  vprompt(EXP, VAL) = VALX and /* decide whether to mention VAL */
  listof(valprompt(FACTOR,VALX)) = SVALS and
  remediate-values(SVALS,ACTUALVALS,R) is sought
.en discussedfactorval(EXP,VAL,FACTOR,R).
```

/**************** DISPLAYALSO ******************************/

/* If S response has one or more correct answers,
   print "also" -- for referring to missing answers. */ if correctvals(SVALS, ACTUALVS) is known and
    display(' also')
then displayalso(SVALS, ACTUALVS).

/******************** DISPLAYCONSULTRETURN ********************/ if display([nl,'------- Returning to Consultation -------',nl]) then
displayconsultreturn.

nocache(displayconsultreturn).

/******************* DISPLAYGOOD *****************************/ nocache(displaygood(X,Y)).

if SFACTORS == [FIRST, SECOND | REM] and /* two or more */
    display(['Good, those are the ',STRG,'s considered by the expert.',nl,
    'See: '])
then displaygood(SFACTORS, STRG).

if SFACTORS == [FIRST] and /* one only */
    display(['Good, that is the ',STRG,' considered by the expert.',nl,
    'See: '])
then displaygood(SFACTORS, STRG).

/******************* DISPLAYINTERRUPT ************************/ if display([nl,'------- Tutoring Interruption -------',nl]) then
displayinterrupt.

nocache(displayinterrupt).

/******************** DISPLAYLST *****************************/ nocache(displaylst(X)).

if LST == [FIRST] and
    display([FIRST,..,nl])
then displaylst(LST).

if LST == [FIRST, SECOND] and
    display([FIRST,' and ', SECOND, ., nl])
then displaylst(LST).

if LST == [FIRST|REM] and
    display([FIRST,', ']) and
    displaylst(REM)
then displaylst(LST).

/******************* DISPLAYTHEVALS **************************/ nocache(displaythevals(X,Y)).

if boolean(GOAL) and
    VALUES == [VAL] and
    display(['that ', GOAL, ' is ', VAL,'.',nl])
then displaythevals(GOAL, VALUES).

if not(boolean(GOAL)) and
    VALUES == [VAL] and
    display(['that the ',GOAL, ' is ',VAL,'.',nl])
then displaythevals(GOAL, VALUES).

```
if not boolean(GOAL) and
   VALUES == [VAL|REST] and
   display(['that the ',GOAL,' is ']) and
   displaylst(VALUES)
then displaythevals(GOAL,VALUES).
```

/*************************** DUAL **********************************/

/* Bookkeeping information, dual(R) = instantiated R.
   This might be done more elegantly. */

```
noautomaticquestion(dual(R)).
multivalued(dual(R)).
```

/************************* EVIDFOR *********************************/

/* evidfor are the rules that concluded that EXP = VAL */
/* seeking "instantiated" will replace R by an instantiated
   version, which concluded this EXPression with this VALue--
   the original rule if it doesn't use vars in the conclusion. */

```
if listof(RULE, cached(EXP = VAL because R) and
            instantiated(R, EXP, VAL) = RULE) = LST
then evidfor(EXP, VAL) = LST.
```

/**************** EXPRESSION ***************************************/

/* extracts expression ("factor") from a rule clause */
/* EXACTLY DUPLICATES CODE IN THE AUTHORING SYSTEM */

```
nocache(expression(X)).

if TERM == listof(E) = X     /* We don't allow listof(V, PROP) */
then expression(TERM) = E.

if TERM == mostlikely(E) = X
then expression(TERM) = E.

if TERM == cached(EXPR) and  /* messy, but factor is well defined */
   expression(EXPR) = E
then expression(TERM) = E.

if TERM == ordered(E) = X
then expression(TERM) = E.

if TERM == E = V    /* put it here or it'll match the above terms */
then expression(TERM) = E.

if TERM == E is X
then expression(TERM) = E.

if TERM == (not EXPR) and
   expression(EXPR) = E
then expression(TERM) = E.

if TERM == E     /* otherwise, return the whole proposition/clause */
then expression(TERM) = E.
```

/********************** FACT ***************************************/

/* This version is the simplest; will rebind vars in F, but we don't
   care here. */

```
nocache(fact(F)).

if kbentry(F = ANYTHING)
then fact(F).
```

```
if kbentry(E = ANYTHING cf N)
then fact(E).
```

/************************* FACTORPROMPT **************************/

/* Prompt for a level 2 probe */

```
question(factorprompt(VALSTRING)) =
['Which factors support ',VALSTRING,?].

multivalued(factorprompt(VAL)).
automaticmenu(factorprompt(VAL)).
enumeratedanswers(factorprompt(VAL)).
```

/************************* FACTORVALUES **************************/
/* Values for expression E that cause rule R to succeed */

```
if kbentry(R:if PREM then Q) and
   listof(V,factorvalues1(PREM,E) = LST and member(LST) = X and not X = []
   and listify(X) = FLST and member(FLST) = V) = LST and
   not LST = []
then factorvalues(R,E) = LST.
```

/************************* FACTORVALUES1 *************************/

/* Auxiliary routine for reading a premise of a rule to collect
the values of expression E that cause the rule to succeed */

```
if PREM = E = V
then factorvalues1(PREM,E) = [V].
```

/* If an expression is NOT a value, then it
is any one of all other possible values */

```
if PREM = (not E = V) and
   valsfor(E) = VALS and
   setdiff([V], VALS) = LST
then factorvalues1(PREM, E) = LST.

if PREM = (P and Q) and
   not P = (R or S) and
   factorvalues2(P, E) = V and
   factorvalues1(Q, E) = LST
then factorvalues1(PREM,E) = [V|LST].

if PREM = (P or Q) and
   factorvalues2(P, E) = V and
   factorvalues1(Q, E) = LST
then factorvalues1(PREM,E) = [V|LST].

if PREM = (P or Q and R) and
   factorvalues2(P, E) = V and
   factorvalues1(Q, E) = LST1 and
   factorvalues1(R, E) = LST2 and
   union(LST1,LST2) = LST
then factorvalues1(PREM,E) = [V|LST].

if factorvalues1(PREM,E) is unknown
then factorvalues1(PREM,E) = [].
```

/************************* FACTORVALUES2 *************************/

/* Same as factorvalues1, but operates on a single clause */

```
nocache(factorvalues2(X,Y)).

if P = E = V
then factorvalues2(P, E) = V.
```

```
if P == (not E = V) and
   valsfor(E) = VALS and
   setdiff(VALS, [V]) = LST
then factorvalues2(P, E) = LST.
if factorvalues2(P, E) is unknown
then factorvalues2(P, E) = [].
```

/****************** FPROMPT **********************************/

```
nocache(fprompt(X,Y)).

if boolean(EXP)
then fprompt(EXP, VAL) = 'this conclusion'.

if stringof(VAL) = STRGVAL and
   stringjoin(['the choice of ',STRGVAL]) = S
then fprompt(EXP, VAL) = S.
```

/******************* HAS-LHS-VAR *****************************/

/* Rule R has a variable in its lefthand side if the instantiated
   expression is not equal to the expression the rule is about.
   SHOULD BE IDENTICAL TO CODE IN THE AUTHORING SYSTEM */

```
nocache(has-lhs-var(R,X)).

if kbentry(R: if P then Q about EXPR) and
   stringof(EXPR) = SEXPR and
   stringof(INSTEXPR) = SINSTEXPR and
   not SEXPR == SINSTEXPR   /* Strings avoid automatic unification */
then has-lhs-var(R, INSTEXPR).
```

/*************** INITIALIZED-POSSIBLE-CONCL-VALS ****************/

/* initializes legalvals for a level 1 probe */

```
if valsfor(EXP) = POSSIBLEVALS and
   do(adda legalvals(conclprompt(EXP)) = POSSIBLEVALS)
then initialized-possible-concl-vals(EXP).
```

/* valsfor is set when the expression is initialized.
   It is the list of all values concluded by rules. */

/******************* INITIALIZED-POSSIBLEFACTORS ***************/

/* initializes legalvals for a level 2 probe */

```
if factorsfor(EXP) = FACTORS and
   do(adda legalvals(factorprompt(VAL)) = FACTORS)
then initialized-possiblefactors(EXP).
```

/******************** INITIALIZED-POSSIBLE-FACTOR-VALS ***********/

/* initializes legalvals for a level 3 probe */

```
if valsfor(EXP) = POSSIBLEVALS and
   do(adda legalvals(valprompt(EXP, F)) = POSSIBLEVALS)
then initialized-possible-factor-vals(EXP).
```

/* valsfor is set when the expression is initialized.
   It is the list of all values concluded by rules. */

/*********************** INSTANTIATED **************************/

/* If the value of the conclusion is a variable in the rule,
   writes an instantiated version of the rule (and records this
   for clean up upon exit of whenfoundtutor). This is done
   when collecting rules that succeeded, just before responding

```
      to a level 2 probe.  Could be moved to discussion of missingfactors
      if we didn't care about showing an instantiated rule. */ if kbentry(R:if P then E = yougottobekidding) and /* kludge to detect var */
   kbentry(R:if PREM then ACTION) and   /* fetch again to get actual var */
   stringof(ACTION) = STRG and   /* Now extract the var */
   stringindex(1,'= ',STRG) = EQPOS and
   EQPOS+1 = VARPOS and
   substring(VARPOS,end,STRG) = S2 and /* Manipulate as string to hold it */
   stringof(VAL) = VALSTRING and   /* In case VAL has spaces or hyphens */
   stringjoin([VALSTRING,' = ',S2]) = EQSTRG and
   termof(EQSTRG) = TERM and
   do(adda temprule:if TERM and PREM then prem(EXPR,VAL) = PREM) and
   do(reset prem(ANYX,ANYY)) and
   prem(EXPR,VAL) = INSTPREM cf N and /* need cf N in case VAL is uncertain */
   stringof(R) = RSTRING and /* convert rule label in case it has hyphens */
   rulecntr = OLDCNTR and
   stringof(OLDCNTR) = CNTRSTR and
   stringjoin([RSTRING,-,CNTRSTR]) = LABEL and /* Label for new version */
   termof(LABEL) = NEWR and
   do(addz NEWR:if INSTPREM then EXPR = VAL) and /* save instantiated version */
   do(set dual(R) = NEWR) and /* bookkeeping for later cleanup */
   copyruleprops(R, NEWR) is sought and
   OLDCNTR+1 = NEWCNTR and
   do(set rulecntr = NEWCNTR)
then instantiated(R,EXPR,VAL) = NEWR.

/* default is the rule itself */ instantiated(R,EXPR,VAL) = R.

/**************** INSTANTIATED-FACTORS ***********************/

/* Simplified version of "instantiated" -- is intended to be used simply
   for instantiating the factors in rules that use variables when
   figuring out missingfactors for a probe 2 response. Will both
   copy var from action expr into factors and "fill in" other vars
   used in the rule. Assumes, of course, that the rule succeeded.
   INSTEXPR is a goal sought during the consult, so it is fully
   instantiated. */ if premise-assigns-vars(R) or has-lhs-var(R,INSTEXPR) and
   not control-rule(R) and
        /* factors in premise use vars, either by new assignment
           or from the action expression, and the rule doesn't
           have side-effects from a "do" or "display" (set in
           the authoring system). */
   not kbentry(R:if P then E = yougottobekidding) and
        /* kludge to detect var on action rhs, in which case rule
           was already instantiated */
   kbentry(R:if PREM then ACTION) and  /* get actual rule */
        /* we don't say "about INSTEXPR" to avoid binding the vars in
           ACTION, which we now stick into the rule, so its bindings
           propagate through the premise factors */
   do(adda temprule:if ACTION and PREM then prem(INSTEXPR) = PREM) and
   do(reset prem(ANYX)) and
   prem(INSTEXPR) = INSTPREM cf N and
                    /* need cf N in case premise cf is uncertain */
   listof(EXP, conjuncts(INSTPREM) = PROPS and /* "rulefactors" code */
          member(PROPS) = TERM and
          not arithproposition(TERM) and
          expression(TERM) = EXP) = LST and
   do(remove temprule)
then instantiated-factors(R,INSTEXPR) = LST.

/* default: the original or previously instantiated rulefactors */
```

```
if rulefactors(R) = LST
then instantiated-factors(R,EXPR) = LST.
```

/********************* INSTVARFACTOR *****************************/

/* Takes instantiated rule (no vars), R, and finds the instantiated
   factor that determined the conclusion, VAL (factor is passed as
   a string). */

```
if kbentry(R:if P then Q) and
   conjuncts(P) = INSTANTIATEDCLAUSES and
   termof(FACTSTRG) = TERM and
   member(INSTANTIATEDCLAUSES) = INSTCL and
   INSTCL == TERM = VAL
then instvarfactor(R,FACTSTRG,VAL) = TERM.
```

/********************* IRRELEVANT *****************************/

/* auxiliary expression */

```
if irrelevant-factors(R,VAL) = FACTORS and
   member(FACTORS) = FACTOR
then irrelevant(R,VAL,FACTOR).
```

/********************* IRRELEVANT-FACTORS *****************************/

/* finds factors in R's premise that set vars that have no effect
   on the matching of fact F (which sets its conclusion) because
   anything would have matched, e.g., wine(red, ANY, medium) will
   match any best-body. Won't work if one var in CONCLFACT is
   is a substring of the other and both are irrelev
   ant. */

```
if listof(FACTOR,
       rulevarfactor(R) = CONCLFACT and /* original clause with vars */
       stringof(CONCLFACT) = FACTSTRG and  /* preserve it */
       instvarfactor(R,FACTSTRG,VAL) = INSTF and /* instantiated clause */
       matchedfact(FACTSTRG,INSTF,VAL) = F and /* kb fact it matched */
       stringof(F) = SF and
       rulevardependson(R) = FACTS and /* from authoring system */
       member(FACTS) = [VARSTRG,FACTOR] and
       stringindex(1,VARSTRG,SF) = N) = LST and /* var is in kb fact
           so factor corresponding to it in the rule is irrelevant */
   not LST == []
then irrelevant-factors(R,VAL) = LST.
```

/********************* LISTIFY *****************************/

/* Value is X if X is a list, otherwise makes it into a list */
```
if X == [ANY] or
   X == [FIRST|REST]
then listify(X) = X.

if listify(X) is unknown
then listify(X) = [X].

nocache(listify(X)).
```

/********************* MATCHEDFACT *****************************/

/* Finds the fact entry in the KB that matches the instantiated
   factor INSTF. FACT is the factor before the rule was
   instantiated (i.e., has more vars), passed as a string.
     e.g., FACTSTRG = "wine(C,B,S)"
           INSTF = wine(red,medium,medium)
           FACT after kbentry match = wine(red,B,medium) = F
   Won't work for facts modified by cfs */

```
if termof(FACTSTRG) = FACT and
   kbentry(FACT = VAL) and
   stringof(FACT) = FS and
   FACT == INSTF and
   termof(FS) = F
then matchedfact(FACTSTRG,INSTF,VAL) = F.
```

/********************* MENTIONED ********************************/

/* True if some rule in RULES mentions FACTOR in its premise.
   Note that this works even when RFACTORS have vars, and FACTOR
   has been instantiated by the var in the rule's action lhs. */

```
if member(RULES) = R and
   rulefactors(R) = RFACTORS and
   member(RFACTORS) = FACTOR
then mentioned(RULES,FACTOR).
```

/******************** MISSINGFACTORS *****************************/

/* X is a missing factor in a level 2 probe response if X is a
   factor in the rule and is not the factor determining the conclusion
   or a factor that is irrelevant for determining the conclusion, VAL */

/* It is worth noting that a fact setting the concl var (= rulevarfactor)
   will be recognized as correct, but if omitted, won't be listed as
   missing. */

```
if listof(X, member(ACTUALFACTORS) = X and
             not member(SFACTORS) = X and
             not rulevarfactor(R) = X and
             not irrelevant(R, VAL, X) ) = LST and
   not (LST == [])
then missingfactors(SFACTORS, ACTUALFACTORS, R, VAL) = LST.
```

/********************* MISSINGVALS ********************************/

```
if setdiff(ACTUALVALUES, SVALUES) = LST and
   not (LST == [])
then missingvals(SVALUES, ACTUALVALUES) = LST.
```

/******************** NUMERICCOMPUTATION **************************/

/* Detects a term with numeric operators, such as SQ/L */
/* IDENTICAL TO CODE IN THE AUTHORING SHELL */ nocache(numericcomputation(X)).

```
if stringof(E) = STRG and
   ["*","/","+"," - "] == NUMERICOPS and  /* use spaces around - to avoid
                        confusion with a hyphen in a term */
   member(NUMERICOPS) = OP and
   stringindex(1,OP,STRG) = N  /* Contains a numeric operator */
then numericcomputation(E).
```

/******************* NUMERICFUNCTION ******************************/

/* IDENTICAL TO CODE IN THE AUTHORING SHELL */ noautomaticquestion(numericfunction(X)).
nocache(numericfunction(X)).

numericfunction(fix(X)).
numericfunction(float(X)).
numericfunction(real_round(X)).
numericfunction(sqrt(X)).
numericfunction(truncate(X)).

```
/********************** REMEDIATE-CONCL *****************************/

/* remediation for a level 1 probe */ multivalued(remediate-concl(G,S,A)).

if correctvals(SVALUES, ACTUALVALUES) = LST and
    display('Good, the expert concluded ') and
    displaythevals(GOAL,LST)
then remediate-concl(GOAL, SVALUES,ACTUALVALUES).

if wrongvals(SVALUES, ACTUALVALUES) = LST and
    display('No, the expert didn''t conclude ') and
    displaythevals(GOAL, LST)
then remediate-concl(GOAL, SVALUES, ACTUALVALUES).

if missingvals(SVALUES, ACTUALVALUES) = LST and
    display('You should') and
    displayalso(SVALUES, ACTUALVALUES) is sought and
    display(' have concluded ') and
    displaythevals(GOAL, LST) and
    listof(VAL, member(LST) = VAL and   /* Collect missed strong vals */
           GOAL = VAL cf CF and CF > 50) = STRONGVALS and
    member(STRONGVALS) = V and
    discussedfactors(GOAL, V)
then remediate-concl(GOAL, SVALUES, ACTUALVALUES).

/********************** REMEDIATE-FACTORS ****************************/

/* remediation for a level 2 probe */ multivalued(remediate-factors(E, V, S, A)).

if correctfactors(SFACTORS, RULES) = CLST and
    showcorrect(SFACTORS, RULES, CLST)
then remediate-factors(EXP,VAL,SFACTORS,RULES).

if wrongfactors(SFACTORS, RULES) = WLST and
    display('Incorrect: ') and
    displaylst(WLST) and
    display('See ') and
    displaylst(RULES)
then remediate-factors(EXP,VAL,SFACTORS,RULES).

/* Technically, should discuss values for factor with respect
to all rules at once.  Or show rest of rule for context. */ if member(RULES) = R and
   instantiated-factors(R,EXP) = RFACTORS and
   missingfactors(SFACTORS,RFACTORS,R, VAL) = MLST and
                                   /* NB: screens factors */
   display([R,' mentions ']) and /* don't say "also" because correct
                                    factors might have come from a different rule */
   displaylst(MLST) and
   member(MLST) = FACTOR and
   not(boolean(FACTOR)) and /* don't prompt for value for boolean */
   not(numeric(FACTOR)) and /* don't prompt for numeric value */
   not valsfor(FACTOR) = [FIRST] and /* don't prompt for single value */
   discussedfactorval(EXP, VAL, FACTOR, R) is sought
then remediate-factors(EXP,VAL,SFACTORS,RULES).

if remediate-factors(EXP,VAL,SFACTORS,RULES) is unknown and
   displaygood(SFACTORS,'factor') and
   displaylst(RULES) and
   display(nl)
then remediate-factors(EXP,VAL,SFACTORS,RULES).
```

/************************* REMEDIATE-VALUES **********************/

/* remediation for a level 3 probe */ multivalued(remediate-values(S, A, R)).

/* Indicate correct values now if the answer isn't perfect */ if correctvals(SVALS, ACTUALVS) = CORRECTLST and
    badvals(SVALS, ACTUALVS) and   /* The answer isn't perfect */
    display('Correct: ') and
    displaylst(CORRECTLST)
then remediate-values(SVALS, ACTUALVS, R).

if wrongvals(SVALS, ACTUALVS) = WLST and
    display('Incorrect: ') and
    displaylst(WLST)
then remediate-values(SVALS, ACTUALVS, R).

if missingvals(SVALS, ACTUALVS) = MLST and
    display(R) and
    displayalso(SVALS, ACTUALVS) is sought and
                    /* insert "also" if some correctvals */
    display(' mentions ') and
    displaylst(MLST)
then remediate-values(SVALS, ACTUALVS, R).

if remediate-values(SVALS,ACTUALVS, R) is unknown and
    displaygood(SVALS,'conclusion') and
    display([R,'.',nl])
then remediate-values(SVALS, ACTUALVS, R).

/******************** RULECNTR **********************************/

/* used to create unique labels for instantiated rules */ rulecntr = 1.

/******************** RULEFACTORS *******************************/

/* Factors for rule; used here to get factors for temporary, instantiated
   rule. SIMPLER THAN VERSION IN AUTHORING SYSTEM; OMITS KBEXPR CHECK
   AND DOESN'T SAVE AS A FACT IN THE KB. Must appear after the facts
   about the kb generated by the authoring system.  Could produce
   duplicates in the list, but doesn't matter. */ if listof(EXP, kbentry(RULE:if PREM then ACT) and
            conjuncts(PREM) = PROPS and
            member(PROPS) = TERM and
            expression(TERM) = EXP) = LST
then rulefactors(RULE) = LST.

/******************** SETDIFF ***********************************/ nocache(setdiff(X,Y)).

if listof(L1,member(LIST1) = L1 and not member(LIST2) = L1) = LST
then setdiff(LIST1,LIST2) = LST.

/******************** SHOWCORRECT ********************************/ nocache(showcorrect(X,Y)).

/* Correct answers in response to level 2 probe = CLST.  List
   them if there are wrong answers, too. */

```
if wrongfactors(SFACTORS, RULES) = WLST and
   display('Correct: ') and
   displaylst(CLST)
then showcorrect(SFACTORS, RULES, CLST).

if display(['Correct.', nl])
then showcorrect(SFACTORS, RULES, CLST).
```

/****************** TRAPS *******************************/

/* This expression is used in the "authoring module." Its value
   is saved in the cache. These declarations prevent errors if
   the authoring process was not completed correctly.*/

```
multivalued(traps).
noautomaticquestion(traps).
```

/********************* TUTORCONCL ************************/

/* Entry point for a level 1 probe */

```
if numeric(GOAL) or
   valsfor(GOAL) = [JUSTONE] and
      /* Give concl and go right to level 2 probe */
   GOAL = V and
   display('The expert concludes ') and
   displaythevals(GOAL,V) and
   display(nl) and
   discussedfactors(GOAL, V)
then tutorconcl(GOAL).

if listof(conclprompt(GOAL)) = SVALUES and
   listof(GOAL) = ACTUALVALUES and
   remediate-concl(GOAL,SVALUES,ACTUALVALUES)
then tutorconcl(GOAL).
```

/******************* VALPROMPT ****************************/

/* prompt for a level 3 probe */

```
multivalued(valprompt(F, V)).
question(valprompt(F, V)) =
['What ', F, ' is consistent with ', V, '?'].
```

/* for speed, should precompute valsfor of factors in rules
for trapped expressions */

/******************** VPROMPT *****************************/

```
nocache(vprompt(EXP,VAL)).

if boolean(EXP)
then vprompt(EXP,VAL) = 'the same conclusion' vprompt(EXP,VAL) = VAL.
```

/******************* WHENFOUNDTUTOR ***********************/

/* main entry point for probing after an expression is determined */

```
if displayinterrupt and
   initialized-possible-concl-vals(GOAL) and
   initialized-possiblefactors(GOAL) and
   tutorconcl(GOAL) and
      /* cleanup(GOAL) is sought -- do this between cases? */
   displayconsultreturn
then whenfoundtutor(GOAL).
```

/************************* WRONGVALS *******************************/

```
if setdiff(SVALUES, ACTUALVALUES) = LST and
   not(LST == [])
then wrongvals(SVALUES, ACTUALVALUES) = LST.
```

/************************* WRONGFACTORS ****************************/

```
/* wrong answers in response to level 2 probe--factors not mentioned
   in the rules that succeed */ if listof(SF,member(SFACTORS) = SF and not mentioned(RULES,SF)) = WLST and
   not WLST == []
then wrongfactors(SFACTORS, RULES) = WLST.
```

APPENDIX IV

DEMONSTRATION OF THE AUTHORING SYSTEM
=====================================

We begin by loading in the authoring system and issuing the "author" command with the name of the knowledge base to which we wish to connect the tutor.

```
M.1> load tshell.kb
M.1> author wine
```

Loading the wine knowledge base...done.

/* The following analysis takes a few minutes. The
    compaction phase is time consuming because of the list
    manipulation involved. */

Analyzing the knowledge base for
expressions concluded by rules...
compacting the list...done.

Which expressions would you like the
tutor to discuss with the student?
    1.  best-body
    2.  best-color
    3.  best-sweetness
    4.  feature
    5.  recommended-body
    6.  recommended-color
    7.  recommended-sweetness
    8.  wine
>> 1,2,8

/* Here is where the pointers are created. This takes a
    minute or so per expression. Factors are expressions in
    the premise of rules; values are those concluded by
    rules.*/

Reading the rules for best-body...done.
Collecting factors and values...done.

```
Reading the rules for best-color...done.
Collecting factors and values...done.

Reading the rules for wine...done.
Collecting factors and values...done.

Save cache file?
>> y
Saving the analyzed cache twine.ca...done.

To run the tutor in a fresh M.1, load kbtutor.kb,
and give the command, teach wine.
```

APPENDIX V

DEMONSTRATION OF TUTORING SYSTEM
================================

```
/* This typescript demonstrates the tutor.  In the examples
given here, a cache contains an analyzed wine knowledge base
for the expressions that teacher has decided to trap (best-color,
best-body, and wine).  Specifically, we have stored the
conclusions made by each rule, the factors in the premise, and
gathered these as properties of the expression itself. */

M.1> load kbtutor.kb
M.1> teach wine
Welcome to KBT.1, the tutor for M.1 knowledge bases.

Loading the knowledge base...done.
Loading the analyzed cache...done.

/* The tutor has added "whenfound" statements for each
        expression it will trap.  Notice that our design is
        completely hidden from the teacher, as well as the
        student. */

To run the tutor, use the restart command.

M.1> restart
Is the main component of the meal meat, fish or poultry?
>> me
Does the meal have veal in it?
>> n
Does the meal have a sauce on it?
>> y
Is the sauce for the meal spicy, sweet, cream or tomato?
>> tom
        /* A "whenfound" associated with best-color, brings in
        the tutor, which prompts the student for a conclusion. */

------- Tutoring Interruption -------
What do you recommend for the best-color?
    1.  red
    2.  white
>> 1
Good, the expert concluded that the best-color is red.

/*The student's answers are checked against what M.1
        concluded, with possible discussion of particular values,
        as shown below.  Here, with a completely correct answer,
        we return to the consultation. */
```

```
------- Returning to Consultation -------
Is the flavor of the meal delicate, average or strong?
>> str /* Another interruption, triggered by the whenfound of
        best-body. We are running the same M.1 code, in a
        different context.*/

------- Tutoring Interruption -------
What do you recommend for the best-body?
    1.  light
    2.  medium
    3.  full
>> 1
No, the expert didn't conclude that the best-body is light.
You should also have concluded that the best-body is medium, full.
Which factors support the choice of full?
    1.  tastiness
    2.  has-sauce
    3.  sauce
>> 2 and 3
rule-4 also mentions: tastiness.

/* The student's answer does not agree with M.1. The
        student missed two conclusions made by M.1. The cf of
        medium is > 50, so we prompt the student to support this
        strong conclusion. The student mentioned 2 of the three
        factors, and is told which rule to examine. */

------- Returning to Consultation. -------
Do you generally prefer dry, medium or sweet wines?
>> med /* The final intervention occurs when M.1 finishes
        determining the wine. As before, we prompt for the
        student's conclusion. Note that he has the same data
        avaliable to M.1. Note also that we print a menu of all
        conclusions made by M.1 rules about wine. This list was
        generated during an analysis ("authoring") phase and
        stored in the cache file, twine.ca */

------- Tutoring Interruption -------
What do you recommend for the wine?
    1.  gamay
    2.  chablis
    3.  sauvignon-blanc
    4.  chardonnay
    5.  soave
    6.  riesling
    7.  gewuerztraminer
    8.  chenin-blanc
    9.  valpolicella
    10. cabernet-sauvignon
    11. zinfandel
    12. pinot-noir
    13. burgundy
>> 1,2,5
Good, the expert concluded that the wine is gamay.
No, the expert didn't conclude that the wine is chablis, soave.
You should also have concluded that the wine is cabernet-sauvignon,
zinfandel, pinot-noir, burgundy.

/*Here the student has a correct value, two wrong values,
        and four missing values. Three missing values are strong
        (cf > 50), so the tutor makes sure that the student knows
        about the relevant evidence. */
```

Which factors support the choice of cabernet-sauvignon?
    1. feature
    2. recommended-sweetness
    3. recommended-color
    4. recommended-body
>> 3,4
rule-42 also mentions: recommended-sweetness.
Incorrect: recommended-body.

> /* The menu for factors is also generated in the analysis
> phase and stored in the cache. The student mentioned a
> factor that was relevant, but missed one and mentioned an
> unnecessary one. The tutor continues with zinfandel,
> another strong conclusion.*/

Which factors support the choice of zinfandel?
    1. feature
    2. recommended-sweetness
    3. recommended-color
    4. recommended-body
>> 2,3
Good, those are the factors considered by the expert.
See: rule-42.

> /* The student's support for zinfandel is correct.*/

Which factors support the choice of burgundy?
    1. feature
    2. recommended-sweetness
    3. recommended-color
    4. recommended-body
>> list rule-42
rule-42:
    if recommended-color = red and
       (recommended-sweetness = dry or
        recommended-sweetness = medium)
    then wine = cabernet-sauvignon and
         wine = zinfandel.

> /* Rather than answering the question about burgundy, the
> student lists the rule mentioned by the tutor. When the
> tutor prompts again, below, the student checks to see if
> M.1 made any conclusion about "feature." Given that it
> did not, this suggests that "feature" is not the correct
> answer.*/

Which factors support the choice of burgundy?
    1. feature
    2. recommended-sweetness
    3. recommended-color
    4. recommended-body
>> show feature
    M.1 has not sought the value of "feature".

Which factors support the choice of burgundy?
    1. feature
    2. recommended-sweetness
    3. recommended-color
    4. recommended-body
>> show recommended-body
    recommended-body = full (80%) because rule-16.
    recommended-body = medium (40%) because rule-15.

> /* The student continues to use M.1's standard commands
> to probe M.1 conclusions, in order to answer the tutor's
> conclusion. The conclusion about recommended-body seems
> consistent with burgundy, so the student enters that.*/

Which factors support the choice of burgundy?
   1. feature
   2. recommended-sweetness
   3. recommended-color
   4. recommended-body
>> 4
rule-44 also mentions: recommended-color.

/* Recommended-body was correct, but color also factored
into the conclusion.*/

------- Returning to Consultation ------- wine = cabernet-sauvignon (100%) because rule-42.
wine = zinfandel (100%) because rule-42.
wine = burgundy (80%) because rule-44.
wine = gamay (40%) because rule-33.
wine = pinot-noir (40%) because rule-43.

/* The consultation is over.  The student now uses the
new M.1 command that is part of the tutor, "evidence
X," to review the conclusions made by M.1.*/

M.1> evidence best-color
Evidence that the best-color is red.
rule-6: main-component, has-veal.

rule-9: has-sauce, sauce.

M.1> evidence best-body
Evidence that the best-body is medium.
rule-4: tastiness.

Evidence that the best-body is full.
rule-4: tastiness.

M.1> evidence wine
Evidence that the wine is gamay.
rule-33: recommended-color, recommended-body, recommended-sweetness.

Evidence that the wine is cabernet-sauvignon.
rule-42: recommended-color, recommended-sweetness.

Evidence that the wine is zinfandel.
rule-42: recommended-color, recommended-sweetness.

Evidence that the wine is pinot-noir.
rule-43: recommended-color, recommended-body, recommended-sweetness.

Evidence that the wine is burgundy.
rule-44: recommended-color, recommended-body.

/* This command makes extensive use of the pointers
stored in the cache during the analysis phase.  It is an
example of the kind of reasoning that the new M.1
metaproposition "kbentry" will make possible for
browsing and auotmatic knowledge base checking.*/

M.1> list kb-79
kb-79:
command(evidence EXP) = [listof(EXP) = VALS and
                        member(VALS) = V and
                        display('Evidence ') and
                        displaythevals(EXP,[V]) and
                        evidfor(EXP,V) = RULES and

```
            member(RULES) = R and
            rulefactors(R) = FACTORS and
            display([R,': ']) and
            displaylst(FACTORS) and
            display(nl) and
            0 = 1].
```

M.1> log off

APPENDIX VI

DEMONSTRATION OF LEVEL THREE PROBES
===================================

```
/* In this example, answers are deliberately wrong in order
to demonstrate the tutor's response to missing values and
missing factors. */

M.1> teach wine
Welcome to KBT.1, the tutor for M.1 knowledge bases.

Loading the knowledge base...done.
Loading the analyzed cache...done.

To run the tutor, use the restart command.

M.1> restart
Is the main component of the meal meat, fish or poultry?
>> me
Does the meal have veal in it?
>> n
Does the meal have a sauce on it?
>> y
Is the sauce for the meal spicy, sweet, cream or tomato?
>> tom
-------- Tutoring Interruption --------
What do you recommend for the best-color?
    1.  red
    2.  white
>> 2
No, the expert didn't conclude that the best-color is white.
You should have concluded that the best-color is red.
Which factors support the choice of red?
    1.  has-veal
    2.  main-component
    3.  has-turkey
    4.  has-sauce
    5.  sauce
>> 3,4
Correct: has-sauce.
Incorrect: has-turkey.
rule-9 also mentions: main-component and sauce /* A level three probe occurs when the student
        omits a factor that supports a conclusion.
        Note that the rule in question (rule 9) indicates
        "not fish" so the tutor determines that meat and
        poultry are the values of main-component that
        are consistent with red (the conclusion of the rule).
        This demonstrates how the tutor must reason ABOUT
```

```
        the rules, rather than simply print them out or
        extract parts of them. */
```

What main-component is consistent with red?
>> options
Your response must be chosen from the following:
meat, fish, poultry.
What main-component is consistent with red?
>> fish
Incorrect: fish.
rule-9 mentions: meat and poultry

```
        /* The student omitted main component and sauce
        which are used by rule 9 to conclude that the
        best-color is red. Therefore, another level
        three probe concerns sauce. */
```

What sauce is consistent with red?
>> list rule-9
rule-9:
    if not main-component = fish and
       has-sauce = yes and
       sauce = tomato
    then best-color = red.

What sauce is consistent with red?
>> tomato
Good, those are the conclusions considered by the expert.
See: rule-9.
------- Returning to Consultation -------
Is the flavor of the meal delicate, average or strong?
>> str
------- Tutoring Interruption -------
What do you recommend for the best-body?
    1. full
    2. light
    3. medium
>> light
No, the expert didn't conclude that the best-body is light.
You should have concluded that the best-body is medium and full
Which factors support the choice of full?
    1. tastiness
    2. has-sauce
    3. sauce
>> 1,3
Correct: tastiness.
Incorrect: sauce.
------- Returning to Consultation -------
Do you generally prefer dry, medium or sweet wines?
>> med
------- Tutoring Interruption -------
What do you recommend for the wine?
    1. gamay
    2. chablis
    3. sauvignon-blanc
    4. chardonnay
    5. soave
    6. riesling
    7. gewuerztraminer
    8. chenin-blanc
    9. valpolicella
    10. cabernet-sauvignon
    11. zinfandel
    12. pinot-noir
    13. burgundy

```
>> 1,2,11
Good, the expert concluded that the wine is gamay and zinfandel.
No, the expert didn't conclude that the wine is chablis.
You should have concluded that the wine is cabernet-sauvignon, pinot-noir
and burgundy.
Which factors support the choice of cabernet-sauvignon?
      1.  feature
      2.  recommended-sweetness
      3.  recommended-color
      4.  recommended-body
>> 1, 3
Correct: recommended-color.
Incorrect: feature.
rule-42 mentions: recommended-sweetness.

/*  Another level three probe--here the tutor must
        cope with a disjunction (OR) clause in the rule. */

What recommended-sweetness is consistent with cabernet-sauvignon?
>> medium
rule-42 also mentions: dry.
Which factors support the choice of zinfandel?
      1.  feature
      2.  recommended-sweetness
      3.  recommended-color
      4.  recommended-body
>> 2,3
Good, those are the factors considered by the expert.
See: rule-42.
Which factors support the choice of burgundy?
      1.  feature
      2.  recommended-sweetness
      3.  recommended-color
      4.  recommended-body
>> 4
rule-44 also mentions: recommended-color.

/* Another level three probe.  Because of similarities
        in probing about expressions and values, M.1 code for
        parts of the tutor is similar and some is shared. */

What recommended-color is consistent with burgundy?
>> white
Incorrect: white.
rule-44 also mentions: red.
------ Returning to Consultation -------
    wine = cabernet-sauvignon (100%) because rule-42.
    wine = zinfandel (100%) because rule-42.
    wine = burgundy (80%) because rule-44.
    wine = gamay (40%) because rule-33.
    wine = pinot-noir (40%) because rule-43.
M.1> log off
```

What is claimed is:

1. A knowledge system comprising a computer having a memory, said memory storing a knowledge base encoding knowledge about a particular subject domain, said computer having a knowledge base interpreter for interpreting said knowledge base to solve specified problems pertaining to said subject domain and to indicate the methods of solution to a subject system, said memory further storing information about the status of the solution of said problems by said knowledge base interpreter, said knowledge base interpreter including means for changing said information about the status of the solution of said problems during said interpreting of said knowledge base, and an evaluation system communicating with said subject system and accessing the knowledge in said knowledge base, said evaluation system including means for probing said subject system about selected portions of said knowledge about said subject domain to obtain responses from said subject system, and means for comparing said responses from said subject system to said selected portions of said knowledge about said subject domain to evaluate the subject system's knowledge and performance with respect to said subject domain, said means for probing and said means for comparing being operative during the operation of said knowledge base interpreter, wherein said knowledge base further encodes knowledge defining a set of interrupt conditions of said status of said solution of said problems, and wherein said computer further includes means for determining whether any of said interrupt conditions occur in said status of the solution of said problems and thereupon interrupting the interpreting of said knowledge base to solve said problems and activating said evaluating system to probe said subject system about the interrupt condition having occurred so that the subject system's knowledge and performance are evaluated while the methods of solution to said specified problems are indicated to said subject system.

2. The knowledge system as claimed in claim 1, wherein said means for comparing includes means for interpreting the knowledge in said knowledge base to determine the knowledge about said subject domain that is relevant to said conditions.

3. The knowledge system as claimed in claim 1, wherein said means for probing includes means for successively probing about said interrupt condition having occurred in response to said means for comparing in order to tailor said probing to the performance of said subject system.

4. The knowledge system as claimed in claim 3, wherein said memory further stores a secondary knowledge base indicating how to tailor said probing to the performance of said subject system, and said means for successively probing includes means for interpreting said secondary knowledge base in order to tailor said probing to the performance of said subject system.

5. The knowledge system as claimed in claim 1, wherein said memory stores a number of case files including knowledge defining a plurality of problems and respective predefined interrupt conditions for said problems, said knowledge system includes means for selecting a desired one of said case files for interpreting said knowledge base to solve a respective one of said problems by reading from said memory said information defining the selected problem, and said means for probing probes said subject system about the respective interrupt conditions for the selected problem.

6. The knowledge system as claimed in claim 1, wherein said means for probing includes means for probing said subject system for conclusions, means for probing said subject system for factors that support said conclusions, and means for probing said subject system for values of factors that are consistent with said conclusions.

7. The knowledge system as claimed in claim 6, wherein said means for comparing includes means for comparing factor identified by said subject system to said factors that are consistent with said conclusions to determine missed factors which are consistent with said conclusions but not identified by said subject system, and said means for probing includes means for probing the subject system for values of said missed factors.

8. The knowledge system as claimed in claim 7, wherein said means for comparing includes means for comparing values identified by said subject for said missed factors to actual values used by said knowledge system for said missed factors, and means for indicating portions of said knowledge base which mention the actual values of missed factors when the values identified by said subject system differ from the actual values of said missed factors.

9. The knowledge system as claimed in claim 1, wherein said means for comparing determines faults of said subject system, and said evaluation system includes means for responding to some of said faults and ignoring others of said faults.

10. The knowledge system as claimed in claim 1, wherein said evaluation system is independent of said subject domain.

11. The knowledge system as claimed in claim 1, wherein said evaluation system further comprises means for generating a record of the subject system's knowledge and performance.

12. The knowledge system as claimed in claim 1, wherein said memory stores an index indicating the location of certain information stored in said knowledge base about said subject domain, and wherein said evaluation system includes means for accessing said knowledge base by reading said index to determine the location of said certain information, and then reading said knowledge base at the determined location.

13. The knowledge system as claimed in claim 12, wherein said index indicates the locations of rules pertaining to said interrupt conditions.

14. The knowledge system as claimed in claim 13, wherein said index also indicates the locations of factors in the premises of said rules pertaining to said interrupt conditions.

15. The knowledge system as claimed in claim 1, wherein said evaluation system includes a control procedure stored in said memory, written in the same language as said knowledge base encoding knowledge about the particular subject domain, and interpreted by said knowledge base interpreter.

16. A knowledge system comprising a computer having a memory, said memory storing a knowledge base including rules of inference encoding knowledge about a particular subject domain, said computer including an interference engine for executing an inference procedure to apply said rules of inference to solve specified problems pertaining to said subject domain, wherein said computer includes an evaluation system for accessing said knowledge base and evaluating the status of the application of said rules of inference in the context of a specified one of a set of predetermined conditions, said memory stores said set of predetermined conditions for specifying when said evaluation system is to evaluate said status, and said inference procedure includes a step for testing whether said predetermined conditions currently hold for said status, and when one of said conditions is found to hold, thereupon interrupting the operation of said inference engine, and initiating operation of said evaluation system to evaluate said status in the context of the condition found to hold.

17. The knowledge system as claimed in claim 16, wherein said set of predetermined conditions is specified by a predefined set of expressions which have values concluded by said rules, said step of said inference procedure is the step at which the value of an expression is found, and said conditions are found to hold when the expression having its value found is a member of said predefined set of expressions.

18. The knowledge system as claimed in claim 17, wherein said evaluation system includes means for determining which rules concluded about the expression having its value found, and means for determining which factors in the rules caused said rules to conclude about the expression having its values found.

19. The knowledge system as claimed in claim 16, wherein said evaluation system includes means for probing a subject system about said predetermined conditions to obtain responses from said subject system, and means for comparing said responses to knowledge in said knowledge base pertaining to said conditions.

20. A knowledge system comprising a computer having a memory, said memory storing a knowledge base capable of being interpreted by a knowledge base interpreter to solve specified problems pertaining to a subject domain, said computer further comprising an authoring system for designing an evaluation procedure, said authoring system comprising means for analyzing the content of said knowledge base to determine a set of interrupt conditions for interrupting said interpreting of said knowledge base when said conditions occur to thereupon initiate said evaluation procedure, and means for designing said evaluation procedure for comparing knowledge about a subset of said interrupt conditions to knowledge obtained from a subject system.

21. The knowledge system as claimed in claim 20, wherein said means for designing said evaluation procedure includes means for presenting to a human user an indication of said set of interrupt conditions, and receiving from said human user an indication of said subset of said interrupt conditions.

22. The knowledge system as claimed in claim 20, wherein said authoring system further comprises means for storing in a secondary knowledge base information defining the interrupt conditions in said subset.

23. The knowledge system as claimed in claim 20, wherein said authoring system is independent of said subject domain.

24. The knowledge system as claimed in claim 20, wherein said knowledge base includes rules which conclude values for expressions, and said means for analyzing includes means for determining which of said rules cannot be discussed by said evaluation procedure.

25. The knowledge system as claimed in claim 20, wherein said knowledge base defines expressions which take on values when said knowledge base is interpreted by said knowledge base interpreter, and said means for analyzing includes means for determining which of said expressions cannot be used as said interrupt conditions.

26. The knowledge system as claimed in claim 20, wherein said knowledge base includes rules and facts which conclude values for expressions, and wherein said means for analyzing includes means for integrating said rules and facts by combining values concluded for an expression by rules with values concluded for the expression by facts.

27. The knowledge system as claimed in claim 20, wherein said knowledge base includes rules which conclude values for expressions, said rules including rules containing variables, and said means for analyzing includes means for determining conclusions a rule with variables can make, and means for instantiating said variables to determine expressions that can be included in the premises of said rules.

28. The knowledge system as claimed in claim 20, wherein said knowledge base includes rules which conclude values for expressions, said subset of said interrupt conditions are indicated by a list of selected ones of said expressions, and said means for analyzing includes means for finding the rules that conclude the selected expressions, means for finding the values concluded by the rules that conclude the selected expressions, means for finding the factors in the premises of the rules that conclude the selected expressions, and means for finding the values concluded about the selected expressions by the rules.

29. The knowledge system as claimed in claim 28, wherein said interrupt conditions appear in said knowledge base and said authoring system further comprises means for storing in said memory pointers to said interrupt conditions appearing in said knowledge base.

30. The authoring system as claimed in claim 20, wherein said authoring system is implemented as a procedure written in the same language as said knowledge base and executed by said knowledge base interpreter.

31. A knowledge system comprising a computer having a memory, said memory storing a knowledge base capable of being interpreted by a knowledge base interpreter to solve specified problems pertaining to a subject domain, said computer comprising an authoring system for designing a domain dependent evaluation procedure, said authoring system includign means for analyzing the content of said knowledge base to determine interrupt conditions defined at locations in said knowledge base for interrupting said interpreting of said knowledge base when said conditions occur to thereupon initiate said evaluation procedure, and means for generating an index of said conditions, said index including pointers to the locations of said conditions in said knowledge base.

32. The knowledge system as claimed in claim 31, wherein said means for generating includes means for adding new entries to said knowledge base.

33. The knowledge system as claimed in 32, wherein said means for analyzing includes means for analyzing entries added to the knowledge base by said means for adding.

34. The knowledge system as claimed in claim 31, further including means for deleting portions of said knowledge base.

35. The knowledge system as claimed in claim 31, wherein said knowledge base includes entries, said knowledge base stores information explaining why respective entries were made, and wherein said means for analyzing includes means for accessing the information explaining why the respective entries were made.

36. A knowledge system comprising a computer having a memory, said memory storing a knowledge base encoding knowledge about a particular subject domain, said computer having a knowledge base interpreter for interpreting said knowledge base to solve specified problems pertaining to said subject domain and indicating the methods of solution to a subject system,
wherein said computer further comprises an authoring system and an evaluation system, said authoring system including:
means for analyzing said knowledge base to identify conditions of interest suitable for interrupting the interpreting of said knowledge base while solving specified problems pertaining to said subject domain,
means for presenting said conditions of interest to a human user for selection of a subset of said conditions suitable for comparing the performance of a subject system to the performance of said knowledge base interpreter for solving said problems, and
means for receiving an indication of said subset of said conditions, and
said evaluation system including:
means for interrupting the operation of said knowledge base interpreter upon the occurrence of a condition included in said subset of said conditions, and means operative upon said interrupting for probing said subject system to obtain a response about the status of the solution of said problem by said knowledge base interpreter, and means for comparing said response to the actual status of the solution of said problem by said knowledge base interpreter.

37. The knowledge system as claimed in claim 36, wherein said authoring system and said evaluation system are domain-independent.

38. The knowledge system as claimed in claim 36, wherein said authoring system and said evaluation system are implemented as procedures interpreted by said knowledge base interpreter and written in the same language as said knowledge base encoding knowledge about the subject domain.

39. The knowledge system as claimed in claim 36, wherein said knowledge base includes rules having factors in premises and concluding values for expressions, and said means for probing includes:

means for probing the subject system for a value of an expression pertaining to said condition upon which the operation of the knowledge base interpreter is interrupted.

means for probing the subject system for factors supporting the value of said expression pertaining to said condition, and means for probing the subject system for the values of factors supporting the values of said expression pertaining to said condition.

40. The knowledge system as claimed in claim 39, wherein said subset of conditions is indicated by a selected subset of said expressions, and said conditions occur when values are found for the expressions included in said subset of expressions.

41. A method of comparing the performance of a subject system to the performance of a knowledge system, said knowledge system comprising a computer having a memory, said memory storing a knowledge base encoding knowledge about a particular subject domain, said computer having a knowledge base interpreter for interpreting said knowledge base to solve specified problems pertaining to said subject domain and indicating the methods of solution to a subject system, said method comprising the steps of:

(a) operating said computer to scan the knowledge base and determine a set of conditions of interest suitable for interrupting the interpretation of said knowledge base while solving specified problems pertaining to said subject domain, (b) operating said computer to transmit to a human user an indication of said set of conditions of interest, (c) operating said computer to receive from said human user an indication of a subset of said set of conditions, (d) operating said knowledge base interpreter to solve a specified problem pertaining to said subject domain, and while operating said knowledge base interpreter, operating said computer to test for the occurrence of said conditions included in said subset of conditions, and upon the occurrence of a condition included in said subset of conditions, to interrupt the operation of said knowledge base interpreter and to (e) probe the subject system to obtain a response about the status of the solution of said problem by said knowledge base interpreter, and (f) compare said response to the actual status of the solution of said problem by said knowledge base interpreter.

42. The method as claimed in claim 41, wherein said knowledge base includes rules concluding values for expressions, and said step (a) of operating said computer to scan the knowledge base includes determining a list of expressions concluded by the rules, said step (b) includes transmitting to the human user said list of expressions concluded by the rules, and step (c) includes receiving from the user a subset of the expressions included in said list, said step (d) includes interrupting the operation of the knowledge base interpreter each time when the knowledge base interpreter finds the value for an expression in said subset, said step (e) probes the subject system for information pertaining to the expression which had its value found and caused the interruption of said knowledge base interpreter.

43. The method as claimed in claim 42, wherein said rules have premises including factors which taken on values, and wherein said step (e) includes operating said computer to probe the subject system for the values of factors in rules which conclude values for the expression which had its value found and caused the interruption of said knowledge base interpreter.

44. The method as claimed in claim 41, further comprising the steps of:

(g) recording in memory a file of test cases including data defining specific problems pertaining to said subject domain and subsets of said conditions of interest, said data defining the specific cases being suitable for input to said knowledge base interpreter; and (h) performing steps (c) to (f) using a selected one of said test cases to specify said specified problem and to specify the subset of conditions for interrupting the operation of the knowledge base interpreter.

45. The method as claimed in claim 41, further comprising the steps of operating said computer to scan the knowledge base for information pertaining to the conditions, operating said computer to store in said memory an index of said information pertaining to each of said conditions in said subset of conditions, and after interruption of said knowledge base interpreter, operating said computer to read said index of information pertaining to the respective condition causing interruption of the knowledge base interpreter in order to find information about the status of the solution of said problem by said knowledge base interpreter.

* * * * *

UNITED STATES PATENT AND TRADEMARK OFFICE
CERTIFICATE OF CORRECTION

PATENT NO. : 4,847,784

DATED : July 11, 1989

INVENTOR(S) : William J. Clancey

It is certified that error appears in the above-identified patent and that said Letters Patent is hereby corrected as shown below:

Col. 2, line 63, change "trademakr" to --trademark--.

Col. 4, line 51, change "wich" to --which--.

Col. 8, line 20, change "turor" to --tutor--.

Col. 14, line 21, before "What" insert --"--.

Col. 14, line 23, after "Then", please insert -- ---.

Col. 14, line 34, before "Good", please delete " " ".

Col. 17, line 21, please change ":" to --"--.

Col. 17, line 22, after "[premise]", please delete "-".

Col. 89, line 55, please change "factor" to --factors--.

Col. 92, line 18, please change "includign" to --including--.

Col. 93, line 24, please change "." to --,--.

Signed and Sealed this

Eighteenth Day of December, 1990

*Attest:*

HARRY F. MANBECK, JR.

*Attesting Officer*     *Commissioner of Patents and Trademarks*